United States Patent [19]

Ogino et al.

[11] Patent Number: 5,712,532
[45] Date of Patent: Jan. 27, 1998

[54] SCALABLE CRT DISPLAY DEVICE AND PHASE SYNCHRONOUS CIRCUIT FOR USE IN DISPLAY DEVICE

[75] Inventors: Masanori Ogino; Yoshiyuki Imoto; Kunio Umehara, all of Yokohama; Jiro Kawasaki, Zushi; Kiyoshi Yamamoto, Yokohama; Miyuki Ikeda, Yokohama; Kazutaka Naka, Yokohama, all of Japan

[73] Assignee: Hitachi, Ltd., Tokyo, Japan

[21] Appl. No.: 306,711

[22] Filed: Sep. 15, 1994

[30] Foreign Application Priority Data

Apr. 4, 1994 [JP] Japan ................ 6-065859
May 6, 1994 [JP] Japan ................ 6-094135

[51] Int. Cl.⁶ .................................. H01V 29/98
[52] U.S. Cl. .................. 315/1; 315/370; 331/20; 348/537
[58] Field of Search .................. 327/156, 158, 327/159; 331/20, 43; 348/537, 556, 806, 564; 345/13; 315/1, 370; 375/355, 359, 373, 375

[56] References Cited

U.S. PATENT DOCUMENTS

| | | | |
|---|---|---|---|
| 3,509,477 | 4/1970 | Verwey et al. | 327/159 X |
| 4,611,230 | 9/1986 | Nienaber | 331/20 X |
| 4,884,040 | 11/1989 | Fling | 348/537 X |
| 4,931,703 | 6/1990 | Ogino | 315/370 |
| 5,053,724 | 10/1991 | Ogino et al. | 331/14 |
| 5,130,800 | 7/1992 | Johnson et al. | 348/564 |
| 5,301,021 | 4/1994 | Ogino et al. | 348/564 |

FOREIGN PATENT DOCUMENTS

| | | |
|---|---|---|
| 37 19 876 A1 | 12/1987 | Germany . |
| 39 31 946 A1 | 4/1990 | Germany . |
| 41 06 990 C2 | 12/1991 | Germany . |
| 43 00 834 A1 | 3/1993 | Germany . |
| 42 43 960 A1 | 12/1993 | Germany . |
| 63-2425 | 1/1988 | Japan . |
| 63-292775 | 11/1988 | Japan . |

OTHER PUBLICATIONS

"Self-Adapting CRT Horizontal Scan Circuit", IBM Technical Disclosure Bulletin, vol. 35, No. 2, Jul. 1992.
"Horizontal Scan Phase–Locked Loop Detector for CRT", IBM Technical Disclosure Bulletin, vol. 26, No. 7a, Dec. 1983.
D. G. Fink, "Television Engineering Handbook", McGraw Hill, 1957, pp. 6–1 6-33.

*Primary Examiner*—Robert Pascal
*Assistant Examiner*—Justin P. Bettendorf
*Attorney, Agent, or Firm*—Antonelli, Terry, Stout, & Kraus, LLP.

[57] ABSTRACT

A CRT display device capable of displaying a signal from the existing image signal source, in which a vertical frequency is approximately fixed and a horizontal frequency is widely distributed beyond a ratio of 3:1, on one image screen. The CRT display device includes a scan converter unit and a display unit. The scan converter unit includes an output horizontal frequency unifying circuit, a horizontal blanking period ratio converting circuit, a vertical frequency converting unit and a vertical blanking period ratio converting circuit. The display unit includes a vertical deflection circuit and a circuit for correcting a vertical S-shaped distortion. In a phase synchronous circuit, a lock-out detector is connected to an output of a three state output digital phase detector, and on the basis of an output thereof, a switch is subjected to the "ON"/"OFF" control. For a period of time when an output of the lock-out detector indicates a lock-out state, a loop gain of the PLL is increased and the pull-in time is shortened. For the remaining periods of time, i.e., in the steady state, the loop gain is decreased and the noise resistance characteristics are improved.

11 Claims, 26 Drawing Sheets

FIG. 2
PRIOR ART
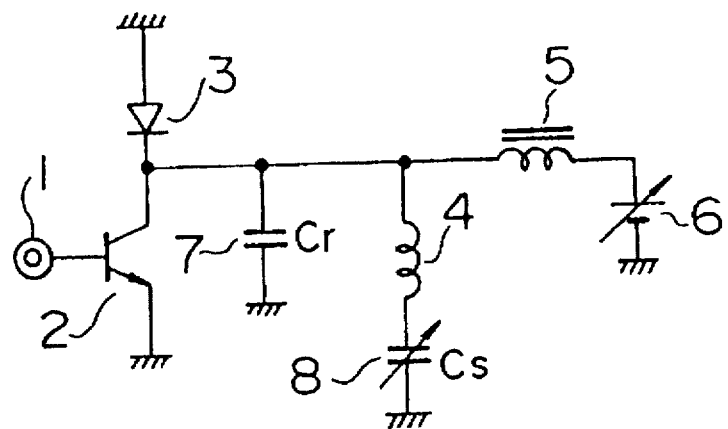
FIG. 3(a)
PRIOR ART
IN-PHASE
FIG. 3(b)
PRIOR ART
OPPOSITE-PHASE
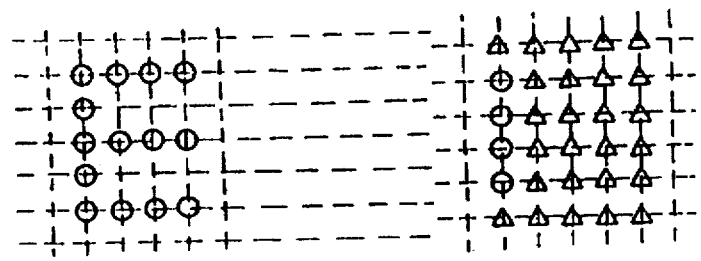

SCALABLE CRT DISPLAY DEVICE AND PHASE SYNCHRONOUS CIRCUIT FOR USE IN DISPLAY DEVICE

BACKGROUND OF THE INVENTION

The present invention relates, in general, to a scalable CRT display device which is applicable to an image signal source having plural scanning standard. Heretofore, a display device which could adapt to a wide range of horizontal deflection frequencies was referred to as the multi-scan type display device or the multi-sync display device. The scalable display device of the present invention means the display device which has a substantially fixed horizontal oscillation frequency and can adapt to a wide range of horizontal deflection frequencies.

In addition, the present invention relates also to a horizontal phase synchronous circuit which is suitable for being used in a display device for receiving a computer signal.

The horizontal scanning frequency of the picture signal source is limited to a narrow range (i.e., the range of about 60 Hz to about 80 Hz). However, the horizontal scanning frequencies are ranged in a wide variety. That is, the horizontal scanning frequency is about 32 kHz in the high quality TV, in the range of about 32 kHz to about 70 kHz in the personal computer and in the range of 60 kHz to 100 kHz in the work station.

In recent years, it is required that the signal having the wide range of frequencies beyond the ratio of 3:1 (the range of about 32 kHz to about 100 kHz) be reproduced utilizing one CRT display.

In addition, in recent years, a need has arisen in work stations that the signals relating to the still picture are sent at a higher horizontal scanning frequency or with the larger number of scanning lines, and the signals relating to the moving image are sent at a lower horizontal scanning frequency or with the less number of scanning lines. Therefore, it is desired that the CRT display device is developed which is adaptable to such a need.

On the other hand, the CRT display operates, as well known, to display the signal relating to the image on the screen on the basis of the electromagnetic deflection physics. As described in an article "TELEVISION ENGINEERING HANDBOOK", by D. G. FINK, McGraw-Hill Book Campany, 1957, pp. 6–1 to 6–33, the electromagnetic deflection physics includes the non-linear distortion of the third order super-linear. That third order distortion can be classified into the pincushion distortion and the S-shaped distortion.

As described in the above-mentioned article, the vertical pincushion distortion can be eliminated by selecting suitably the distribution of the coil of the deflecting yoke. However, in this case, the S-shaped distortion can not be eliminated at all. The S-shaped distortion is, in the prior art, compensated by the so-called S-capacitor for correcting the S-shaped distortion which is connected in series to the deflecting coil. In this connection, the capacitance value of the S-capacitor for correcting the horizontal S-shaped distortion needed to be switched approximately in inverse proportion to the square of the horizontal scanning frequency. The horizontal deflection output circuit of this prior art is shown in FIG. 2.

In the figure, reference numeral 1 designates an input terminal for receiving a horizontal pulse signal, reference numeral 2 designates a horizontal output transistor, reference numeral 3 designates a diver diode, reference numeral 4 designates a horizontal deflecting coil, reference numeral 5 designates a choke coil for supplying the power source, and reference numeral 6 designates a variable voltage source, the voltage of which is needed to be proportional to the horizontal scanning frequency. In addition, reference numeral 7 designates a resonance capacitor which operates to resonate with the horizontal-deflection coil 4 for the vertical blanking period to generate a flyback pulse. Reference numeral 8 designates a S-capacitor for correcting the S-shaped distortion which operates to integrate a saw-tooth-wave current flowing through the horizontal deflection coil 4 to develop the parabola wave-like voltage thereacross. By utilizing the parabola wave-shaped voltage, the correction of the S-like distortion is performed.

The capacitance value of the S-capacitor for correcting the S-shaped distortion needed to be switched approximately in inverse proportion to the square of the horizontal scanning frequency.

Both the control of the power source voltage and the switching control of the S-capacitor for correcting the S-shaped distortion resulted in the CRT display device being excessively expensive. In addition, by the transient phenomenon occurring in connection with the switching operation, the horizontal output transistor 2 may be broken down in some cases. This became a problem in terms of reliability.

Under those circumstances, in the prior art, the applicable range of the horizontal scanning frequency of the input signal was limited to the range of the ratio of about 2:1.

As another prior art means for overcoming the above-mentioned circumstances, the means was also adopted such that by operation of the scan converter including both a digital frame memory and means for interpolating the digital scanning lines, most of the input signals were converted into signals of a sample scanning standard.

For the sake of convenience of the description, it is assumed that the horizontal scanning frequency of the single scan type display device is $f_{HO}$, the vertical scanning frequency is $f_{VO}$, and the total number of scanning lines is So.

The prior art scan converter system was suitable in the case where the total number of scanning lines of the input signal was approximately equal to So/n (n: integral number). However, in the case where that relationship was not established, there was an inconvenience. More specifically, in the case where the total number of scanning lines of the input signal was about 0.9 times as small as So, there was the inconvenience in which the very fine character of the signal source could not be faithfully reproduced. For example, in the case where the number of scanning lines of the input signal is 900 and the number of scanning lines of the display device is 1,000, let us consider that the character "E" is included in a part of the screen. This case is schematically shown in FIG. 3.

FIG. 3(a) shows a view in the case where the scanning line of the input is in phase with that of the output, and FIG. 3(b) shows a view in the case where the scanning line of the input is just in opposite phase with that of the output. In the figures, the horizontal dotted lines represent the respective positions of the scanning lines of the display device. In order to make the discrimination between the in-phase and the opposite-phase clearer, the individual scanning lines of FIG. 3(a) are extended up to the right side. The vertical dotted lines represent the sampling phases of the digital clock. The clock sampling phases are not important in the figures. The positions of the intersections of the dotted line-like lattice correspond to the respective positions of the output picture elements of the display device. Each circle on the associated intersection represents the output "1", each triangle on the associated intersection represents the output "0.5", and each position having no mark on the associated intersection represents the output "0". As can be seen from the figures, in the case of the in-phase shown in FIG. 3(a), the character "E" can be faithfully reproduced. However, in the case of the opposite-phase shown in FIG. 3(b), it is impossible to make out the character "E". That is, in the scanning converter of the prior art, there arose the problem that the character font disappeared due to the interpolation of the scanning lines.

In addition, another problem associated with the prior art is as follows.

Although in general, the definition of the image can be improved as the clock frequency of the image signal generating circuit in the work station is made higher, the burden imposed on the work station is increased all the more. Under the conditions of the same definition, the clock frequency can be decreased as the ratio of the horizontal blanking period to the vertical blanking period is further decreased. Decreasing the clock frequency is desirable for reducing the disturbance of the radio wave radiating from the cable for transmission of the signal from the work station to the CRT display device.

However, on the other hand, if the vertical blanking period of the CRT display device is reduced by half for example, the amplitude voltage of the horizontal flyback pulse signal is approximately doubled. Thus, there arose another problem that the horizontal output transistor (2 shown in FIG. 2) was liable to be easily broken down by that large voltage.

In prior art scan converters, such as one disclosed in U.S. Pat. No. 5,301,021 to Ogino et al. assigned to the same assignee, the phase of the sampling clock needed to be finely set every work station. For example, for the work station having the clock frequency of 150 MHz, it was necessary that the period of 6 nsec was divided into about ten equal parts, the ten kinds of phase were prepared at a step of about 0.6 nsec, and the most suitable one among them was finely set.

As well known, the delay time of 0.6 nsec corresponds to the cable length of about 12 cm.

Therefore, there arose the problem that with respect to the prior art scan converter, whenever the cable length was changed in correspondence to the use installation conditions thereof, the phase of the sampling clock needed to be finely set again.

In U.S. Pat. No. 5,053,724, there is disclosed a horizontal phase synchronous circuit employing an analog phase detecting circuit. In addition, in JP-A-63-292775, there is disclosed a horizontal phase synchronous circuit employing a three state output digital phase detector. The system employing the digital phase detector has the advantage that the pull-in range is very wide. However, in the above-mentioned prior art, the horizontal phase synchronous circuit in which the noise resistance characteristics may be compatible with the high speed pull-in characteristics is not referred at all.

In a digital image display device having an image signal input portion including an A/D converter, as for the clock frequency of the image signal, the high frequency of 40 MHz to 200 MHz is required. In the case where the clock frequency is 200 MHz, the accuracy of the timing of the clock for the sampling in the A/D converter is required to be within ±0.5 nsec (i.e., ±10% of the clock period). In order to attain such high accuracy, the cut-off frequency (the response speed) of the horizontal phase synchronous circuit of the image display needs to be reduced down to a level equal to or lower than about 250 Hz. However, there arose a problem that if the response speed was decreased in such a manner, the noise immunity, i.e., the timing accuracy was fulfilled, but the pull-in time was increased up to about 1 to 2 sec.

Reference may further be made to JP-A-63-2425 and JP-A-63-87823 which relate to prior art PLL.

SUMMARY OF THE INVENTION

It is therefore an object of the present invention to provide a display device which is capable of overcoming at least one of the above-mentioned problems associated with the prior art.

More specifically, it is another object of the present invention to provide a CRT display device which is capable of reproducing the image signals of the various kinds of signal sources having such a wide range of horizontal frequencies that even exceeds the frequency ratio of 3:1 on its screen.

It is yet another object of the present invention to provide a CRT display device which is capable of preventing the disappearance of the character font due to the interpolation of the scanning lines of the prior art scan converter.

It is still another object of the present invention to provide a CRT display device which is capable of making the switching of the S-capacitor for correcting the horizontal S-like distortion unnecessary which was required for the multi-scan type display device of the prior art.

It is a further object of the present invention to provide a CRT display device which is capable of increasing the horizontal blanking period ratio of the horizontal deflection output circuit as compared with that of the prior art.

In order to attain the above-mentioned objects, the CRT display device of the present invention includes, in the basic embodiment, at least scan converter means and vertical deflection means corresponding to such a wide range frequency as to be beyond the frequency ratio of 3:1. The scanning converter means includes digital memory means and output horizontal frequency unifying means in order to convert such a wide range input horizontal frequency as to be beyond the frequency ratio of 3:1 into substantially one output horizontal frequency.

Further, in order to prevent the disappearance of the character font due to the scanning line interpolation of the prior art scan converter, the scan converter means includes output vertical frequency converting means for converting the vertical frequency of the output signal, in correspondence to the number of scanning lines to be imaged in the input signal.

The vertical deflection means includes frequency independent type means for automatically correcting the vertical S-shaped distortion in which the frequency dependency of the S-shaped distortion correcting capacitor is eliminated.

Further, the scan converter means includes horizontal blanking period ratio converting means for converting the horizontal blanking period ratio of the input signal into a larger blanking period ratio (ranging from 1/5 up to 1/3).

In the concrete embodiments of the present invention, there are shown concrete embodiments and the modifications of each of the means in the above-mentioned basic embodiment. In addition, in a different modified embodiment, there is shown means for automatically setting a phase of a sampling clock.

In another embodiment, there is shown pre-boost vertical deflection means for improving the efficiency of a horizontal deflection circuit.

In yet another embodiment, there is shown means for inserting a reference amplitude signal into an image signal which operates to improve the color reproduction of the display device.

In still another embodiment, there is shown means for controlling a focus voltage of a display unit.

In a further embodiment, there is shown means for processing a reference amplitude signal which is effective in the case where an image signal input interface of the display device is made an optical fiber form.

The scan converter means operates to write the data relating to the input image signals to the digital memory means, and the reading process is executed synchronously with the horizontal pulse having the substantially fixed frequency by the horizontal frequency simplifying means. As a result, the output horizontal frequency is substantially singularlized or unified to one frequency.

The output vertical frequency correcting means operates to output the signal having the vertical frequency which is substantially inversely proportional to the total number of scanning lines of the output signal. As a result, it is possible to prevent the disappearance of the character font due to the scanning line interpolation.

The S-like distortion automatic correcting means of the vertical deflection means is implemented, without use of a reactance element, by a cubic arithmetic circuit which is employed instead of the reactance element. Therefore, the correction of the S-shaped distortion can be attained irrespective of the vertical scanning frequency.

The blanking period of the deflection circuit is increased by the horizontal blanking period ratio converting means. As a result, the voltage amplitude of the horizontal flyback pulse signal can be reduced, which in turn contributes to an improvement in the reliability.

The means for automatically setting a phase of a scanning clock operates to detect the deviation or shift of the timing of the input image signal to set the phase of the sampling clock so as to optimize the deviation. As a result, it is possible to eliminate the laber required for the manual setting.

The pre-boost vertical deflection means operates to perform the pre-boost deflection so as for the electron beams to be emitted downward and outside the picture frame in the first half of the vertical blanking period, and perform the vertical retrace (or fly-back) line deflection in the second half thereof utilizing the flyback resonance phenomenon. Therefore, it is possible to attain the reduction of the required electric power for the vertical retrace lines.

The means for inserting a reference amplitude signal operates to insert, for the time period of the pre-boost deflection which is performed so as for the electron beams to be emitted downward and outside the picture frame, the reference amplitude signal into the image signal. As a result, the image relating to the reference signal can be concealed to the outside of the picture frame.

The means for controlling a focus voltage is composed of a focus transformer which is connected between a power supply terminal of the horizontal deflection output circuit and the capacitor for correcting the horizontal S-shaped distortion. In this connection, the primary side of the focus transformer acts as a choke coil for supplying the power source current to the horizontal deflection output circuit so that from the secondary side thereof, the parabola wave-like horizontal dynamic focus controlling voltage is obtained.

The means for processing a reference amplitude signal operates to detect the amplitude of the reference signal which is inserted into the front porch interval in the horizontal blanking period and control the gain of an input photoelectric transform circuit so as to make that amplitude fixed. As a result, it is possible to prevent the fluctuation of the image due to the fluctuation in the loss of the input transmission line and the photoelectric transform circuit.

It is a further object of the present invention to provide a phase synchronous circuit which is excellent in the noise immunity.

It is an even further object of the present invention to provide a phase synchronous circuit which has the high speed pull-in characteristics.

In order to attain the above-mentioned objects, the phase synchronous circuit according to one aspect of the present invention includes lock-out detecting means for detecting a lock-out state of the phase synchronous circuit, and loop gain switching means for switching a loop gain of the phase synchronous circuit.

Preferably, the phase synchronous circuit of the present invention includes gate means for passing therethrough only the interval containing the timing of a detecting edge of the input synchronous signal, and gate function switching means for performing ON/OFF switching with respect to a gate function of the gate means.

The gate means operates to shut, i.e., eliminate the noise components which are contained in the remaining intervals other than the interval including the timing of the detecting edge of the input synchronous signal. As a result, it is possible to improve the noise immunity of the phase synchronous circuit.

The loop gain switching means operates to increase the loop gain of the phase synchronous circuit by two times or more for a period of time when the output signal of the lock-out detecting means shows the lock-out state. In addition, the gate function switching means operates to substantially stop the operation of the gate function of the gate means for a period of time when the output signal of the lock-out detecting means shows the lock-out state. As a result, it is possible to attain the high speed pull-in operation of the phase synchronous circuit.

In addition, the loop gain switching means operates to hold the loop gain of the phase synchronous circuit at a predetermined low level for a period of time when the output signal of the lock-out detecting means shows the lock-in state. As a result, it is possible to improve the noise immunity.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 2 is a circuit diagram showing a configuration of a horizontal deflection output circuit of the prior art;

FIGS. 3(a) and 3(b) are views useful in explaining the problems associated with the prior art;

DESCRIPTION OF THE PREFERRED EMBODIMENTS

Figure 1:
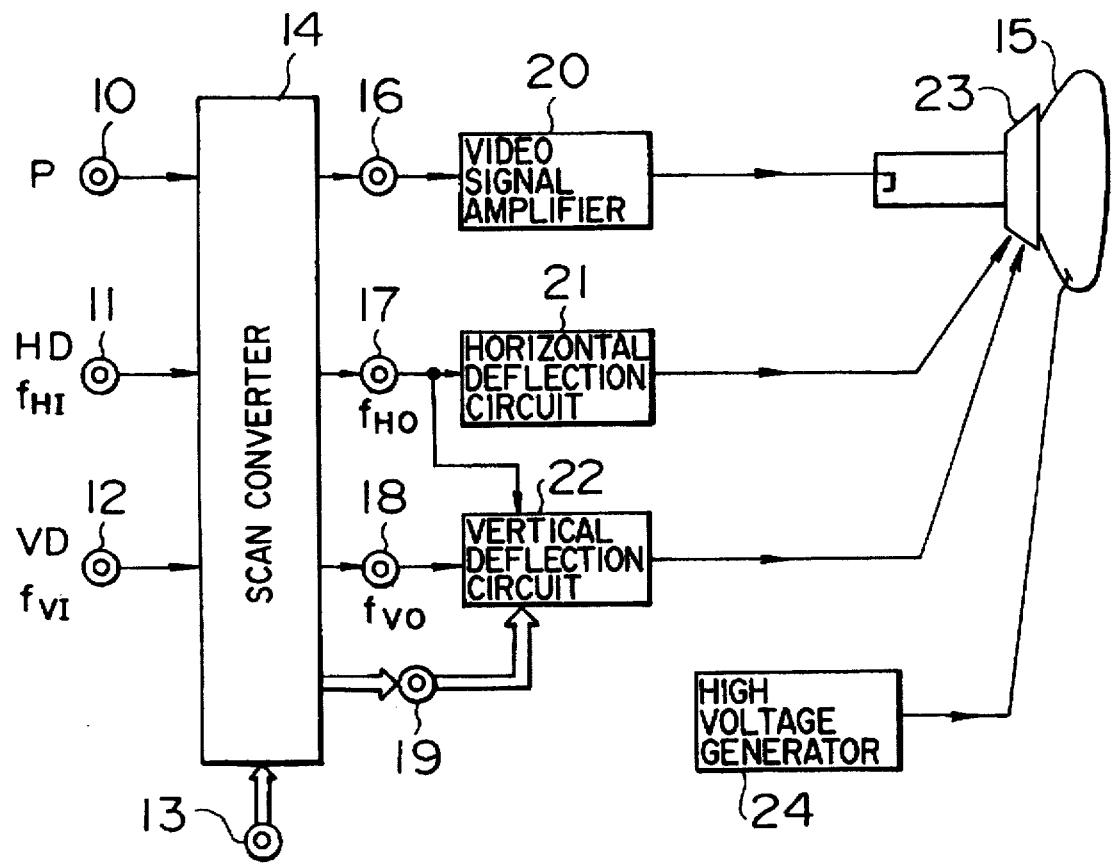
FIG. 1 is a block diagram showing the whole configuration of a scalable CRT display device of the basic embodiment of the present invention.

The preferred embodiments of the present invention will hereinafter be described in detail with reference to the accompanying drawings in which the same parts are designated by the same reference numerals.

FIG. 1 shows a configuration of the basic embodiment of the present invention. In the following figures, each single solid line represents an analog signal, and each double solid line represents a digital signal. In FIG. 1, reference numeral 10 designates an input terminal for receiving an image signal, reference numeral 11 designates an input terminal for receiving a horizontal synchronous signal, reference numeral 12 designates an input terminal for receiving a vertical synchronous signal, reference numeral 13 designates an input terminal for receiving a bus signal, reference numeral 14 designates a scan converter means, and reference numeral 15 designates a CRT (a cathode ray tube). In addition, reference numerals 16, 17, 18 and 19 designate terminals which are used as output terminals of the scan converter 14 and also input terminals of the display unit provided in the subsequent stage. Those terminals 16, 17, 18 and 19 correspond to an image signal, a horizontal synchronous signal, a vertical synchronous signal and a bus signal, respectively. Reference numeral 20 designates a well known circuit means for amplifying an image signal, reference numeral 21 designates a well known horizontal deflection circuit means, and reference numeral 22 designates a vertical deflection circuit means including a circuit for automatically correcting a vertical S-shaped distortion. Reference numeral 23 designates a well known deflecting yoke means including a deflecting coil and the like. Reference numeral 24 designates a well known circuit means for generating a high voltage. In the figure, both the scan converter 14 and the vertical deflection circuit 22 are peculiar to the present invention. While the details thereof will be described later, the important points are summarized here in Table 1 as follows.

TABLE 1

(1) to (4): basic embodiment, (5): modification

| | | Scanning Converter Unit | | Vertical | |
|---|---|---|---|---|---|
| | | Input Signal | Output Signal | Deflection Circuit | Effect |
| (1) | Horizontal Frequency | variable | fixed | — | *1 |
| (2) | Vertical Frequency | variable | variable and inversely proportional to total number of output scanning lines | adaptable to wide frequency range | *2 |
| (3) | Correction of Vertical S-like Distortion | — | — | independent of vertical frequency | *3 |
| (4) | Horizontal Blanking Period Ratio | small | large (⅕ to ⅓) | — | *4 |
| (5) | Setting of Sampling Clock Phase | automatic | | | *5 |

*1 realization of unnecessity of the switching of the capacitor for correcting the S-like distortion of the horizontal deflection circuit, and reduction of the cost.
*2 prevention of disappearance of the character font.
*3 realization of unnecessity of the capacitor for correcting the S-shaped distortion of the vertical deflection circuit.
*4 reduction of the amplitude of the flyback pulse voltage, and promotion of high reliability.
*5 realization of unnecessity of the manual setting, and promotion of easiness of the maintenance.

In Table 1, the points underlined constitute the important features of the present invention.

Figure 4:
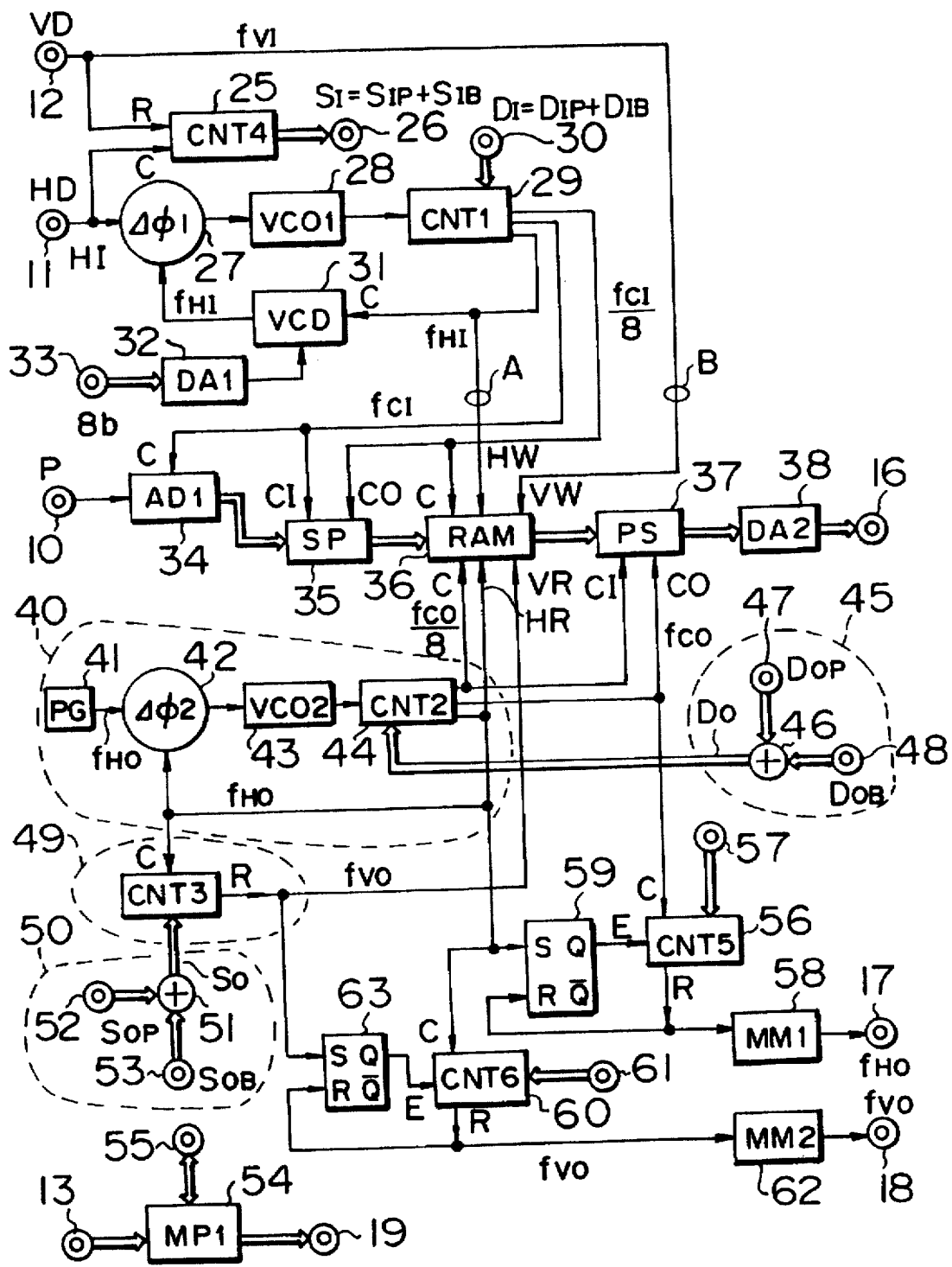
FIG. 4 is a block diagram showing the detailed configuration of a scan converter unit of the basic embodiment of the present invention.

FIG. 4 shows a configuration of a concrete embodiment of the scan converter unit 14 provided in the basic embodiment shown in FIG. 1. In the figure, reference numerals 10, 11, 12, 13, 16, 17, 18 and 19 designate the same constituent elements as those shown in FIG. 1. A dotted line 40 surrounds a circuit means for unifying an output horizontal frequency, a dotted line 45 surrounds a circuit means for converting a horizontal blanking period ratio, a dotted line 49 surrounds a circuit means for converting an output vertical frequency, and a dotted line 50 surrounds a circuit means for converting a vertical blanking period ratio. A signal, which is input to an input portion of each of the blocks shown in FIG. 4 and designated by reference symbol "C" represents a clock trigger, reference symbol "R", which is written to the input or output portion, means reset, and reference symbol "E" written means enable.

Reference numeral 25 designates a counter which operates to count an input horizontal pulse signal and to be reset by an input vertical pulse signal. Therefore, from its output terminal 26, the signal relating to the total number of scanning lines ($S_I$) of an input signal is output. $S_I$ is equal to the sum of the number of scanning lines for the image display of the input signal ($S_{IP}$) and the number of scanning lines for the retrace lines ($S_{IB}$). Reference numerals 26, 30, 33, 47, 48, 52, 53, 57 and 61 designate bus terminals which are connected to a bidirectional bus terminal 55 of a microprocessor 54. Thus, the signal relating to the total number of scanning lines of the input signal ($S_I$) is transferred to the microprocessor 54 to be stored in a register (not shown in the figure for the sake of simplicity of the drawing) provided in the microprocessor 54.

Reference numeral 27 designates a phase detector, reference numeral 28 designates a voltage controlled oscillator (hereinafter, referred to as a "VCO" for short, when applicable), reference numeral 29 designates a counter, and reference numeral 31 designates a voltage controlled delay element. The voltage controlled delay element 31 is provided, in FIG. 4, between the phase detector 27 and the counter 29. However, alternatively, the voltage controlled delay element 31 may be provided between the horizontal synchronous signal input terminal 11 and the phase detector 27. Those constituent elements 27, 28, 29 and 31 constitute a first PLL (a first phase locked loop). The frequency of the input pulse to the first PLL is represented by $f_{HI}$ and in the range of 32 kHz to 100 kHz. The count end point ($D_I$) of the counter 29 is set in the form of a numeral of 11 bits from the terminal 30. $D_I$ is the sum of the number of picture elements for displaying the input image signal $D_{IP}$ and the number of picture elements for the retrace lines $D_{IB}$. Therefore, the oscillation frequency $f_{CI}$ of the VCO 28 is represented by $D_I \cdot f_{HI}$. The counter 29 outputs at least three output signals respective frequencies of which are, as shown in the figure, $f_{CI}$, $f_{CI/8}$ and $f_{HI}$. The voltage controlled delay element 31 can be concretely realized by a monostable-multivibrator which is capable of controlling the pulse width thereof. The delay time variable range of the voltage controlled delay element 31 is set so as to cover the inverse number of $f_{CI}$, i.e., the clock period T. The amount of delay time is determined by the output of a D/A converter 32. The input to the A/D converter 32 is set from the terminal 33. Hereinabove, the description of the first PLL has been completed.

Reference numeral 34 designates an A/D converter, reference numeral 35 designates a series-parallel converter having a ratio of 1:8 in the succeeding stage, reference numeral 36 designates digital memory means in the succeeding stage, reference numeral 37 designates a parallel-series converter having a ratio of 8:1 in the succeeding stage, and reference numeral 38 designates a D/A converter in the succeeding stage. As for the input signals to the series-parallel converter 35, CI represents a series clock trigger for the input and CO represents a parallel clock trigger for the output. The input signals from the upper side to the digital memory means 36 mean the writing inputs. In this connection, HR and VR represent the horizontal reset pulse signal and the vertical reset pulse signal, respectively. The input signals from the lower side to the digital memory means 36 mean the reading inputs. In this connection, HR and VR represent the horizontal reset pulse signal and the vertical reset pulse signal, respectively.

Reference numeral 41 designates a pulse generator which operates to generate a pulse train having a fixed frequency $f_{HO}$ (about 100 kHz). Reference numeral 42 designates a phase detector, reference numeral 43 designates a voltage controlled oscillator, and reference numeral 44 designates a counter, a count end point $D_o$ of which is applied from a circuit 45 for converting a horizontal blanking period ratio. The constituent elements 42, 43 and 44 constitute a second PLL, with outputs at least three output pulse signals respective frequencies of which are $f_{CO}$, $f_{CO/8}$ and $f_{HO}$. Those pulse signals are, as has already been described, applied to both the digital memory 36 and the parallel-series converter 37. To bus input terminals 47 and 48 of the horizontal blanking period ratio converting circuit 45, the signal relating to the number of picture elements for the reproduction $D_{OP}$ per scanning line and the signal relating to the number of picture elements for the retrace lines $D_{OB}$ per scanning line are respectively input. Reference numeral 46 designates an adder an output $D_o$ of which is the sum of $D_{OP}$ and $D_{OB}$. In the case where the horizontal enlargement ratio of the reproduced image is set to 1, the value of $D_{OP}$ is set equal to the value of $D_{IP}$ (30) described above, and the value of $D_{OB}$ is set in such a way that the value of $D_{OB}/f_{co}$ is approximately equal to the value of the horizontal blanking period of the display unit in the succeeding stage. By making the value of the horizontal blanking period ratio, $D_{OB}/D_o$, of the reproduced image larger than that, $D_{IB}/D_I$, of the input image signal, the increasing of the horizontal blanking period ratio can be attained. Normally, the value of $D_{IB}/D_I$ is about ⅙. In the present invention, the value of $D_{OB}/D_o$ is set in the range of about ⅕ to about ⅓. As a result, the magnification can be improved up to 1.2 or more. In other words, the amplitude of the above-mentioned horizontal flyback pulse signal of the display unit in the succeeding stage can be reduced by about 20% or more. In general, the consumed power of the switching of the horizontal output transistor of the CRT display device is, as well known, proportional to the amplitude of the horizontal flyback pulse signal and inversely proportional to the pulse width thereof. Therefore, on the basis of the above-mentioned improvements, the consumed power can be reduced by about 40% or more.

The output horizontal pulse signal having the frequency $f_{HO}$ of the counter 44 is supplied to the display unit in the succeeding stage through an SR flip-flop 59, a counter 56, a monostable-multivibrator 58 and a terminal 17 which are provided in the subsequent stages. The count end value of the counter 56 is supplied from the terminal 57, and in accordance with that count end value, the rise timing of the output horizontal pulse 17 is determined. On the basis of the resultant value, the horizontal position of the reproduced image is set.

The output horizontal pulse signal of the counter 44 is further transmitted to a unit 49 for converting an output vertical frequency, which is concretely a 11 bit-counter. The count end point of the 11 bit-counter is input from a unit 50 for converting a vertical blanking period ratio. The circuit means 50 for converting a vertical blanking period ratio includes an adder 51 and input terminals 52 and 53. The signal relating to the number of scanning lines for the output reproduction Sop and the signal relating to the number of scanning line for the output retrace lines $S_{OB}$ are input to the input terminals 52 and 53, respectively, and the adder 51 outputs the signal relating to the sum $S_o$ of those numbers. The value of $S_{OB}$ is set in such a way that the value of $S_{OB}/f_{HO}$ becomes approximately equal to the value TVB of the vertical blanking period (normally, about 500 μsec) of the display unit in the subsequent stage. Since $f_{HO}$ is about 100 kHz, and the value of $S_{OB}$ is about 50. The value of $S_{op}$ is, in the case where the vertical enlargement ratio of the reproduced image is 1, set equal to the above-mentioned $S_{IP}$. The vertical blanking period ratio of the input image signal is defined on the basis of the ratio of $S_{IB}$ to $S_I$, i.e., $S_{IB}/S_I$, and that of the output signal is defined on the basis of $S_{OB}/S_o$. In the case where the input image signal is a television signal of a high quality TV system, $f_{HI}$ is about 32 kHz, $S_{IB}$ is about 45 and $S_I$ is about 563. In the above-mentioned case, the ratio of $S_{IB}/S_I$ is 45/563, and the ratio of $S_{OB}/S_o$ is 50/(563−45+50). Therefore, the latter becomes larger than the former. That is, the circuit 50 shown in FIG. 4 operates as a vertical blanking period ratio converter means.

The output signal of the circuit means 49 for converting an output vertical frequency is transmitted to the display unit in the subsequent stage through an SR flip-flop 63, a counter 60, a monostable-multivibrator 62 and a terminal 18. The count end value of the counter 60 is supplied from the terminal 61, and in accordance with that count end value, the rise timing of the output vertical pulse signal 18 is determined. Then, on the basis of the resultant value relating that rise timing, the vertical position of the reproduced image is set.

The Expressions which have been used in the above-mentioned description with reference to FIG. 4 are collectively shown as Expressions (1) to (11) as follows.

$$S_I = S_{IP} + S_{IB} \tag{1}$$

where $S_I$ is the total number of scanning lines of the input image signal, $S_{IP}$ is the number of scanning lines for the image display of the input image signal, and $S_{IB}$ is the number of scanning lines for the vertical retrace lines of the input image signal.

$$S_o = S_{OP} + S_{OB} \tag{2}$$

where the suffix "o" means the output, and thus, the meanings of the individual terms are the same as those of Expression (1) except that the input is replaced with the output.

$$D_I = D_{IP} + D_{IB} \tag{3}$$

where $D_I$ is the total number of picture elements per scanning line of the input image signal, $D_{IP}$ is the number of picture elements for the display per scanning line of the input image signal, and $D_{IB}$ is the number of picture elements for the vertical retrace lines per scanning line of the input image signal.

$$D_o = D_{OP} + D_{OB} \tag{4}$$

where the suffix "o" means the output, and thus, the meanings of the individual terms are the same as those of Expression (3) except that the input is replaced with the output.

$$R_{VI} \equiv S_{IB}/S_I \tag{5}$$

$$R_{VO} \equiv S_{OB}/S_O \tag{6}$$

$$= T_{VB}/f_{VO} \tag{7}$$

$$R_{HI} \equiv D_{IB}/D_I \tag{8}$$

$$R_{HO} \equiv D_{OB}/D_o = f_{HO}T_{HB} \approx \frac{1}{5} - \frac{1}{3} \tag{9}$$

$$f_{VO} = \frac{f_{HO}}{S_{OP} + S_{OB}} = \frac{f_{HO}}{S_o} \tag{10}$$

$$S_{OB} = T_{VB} f_{HO} \approx 500 \text{ μs} \cdot 100 \text{ KHz} = 50 \tag{11}$$

$R_{H/V\ I/O}$ represents the ratio of the horizontal blanking period to the vertical blanking period of the input and output signals.

Figure 5A:
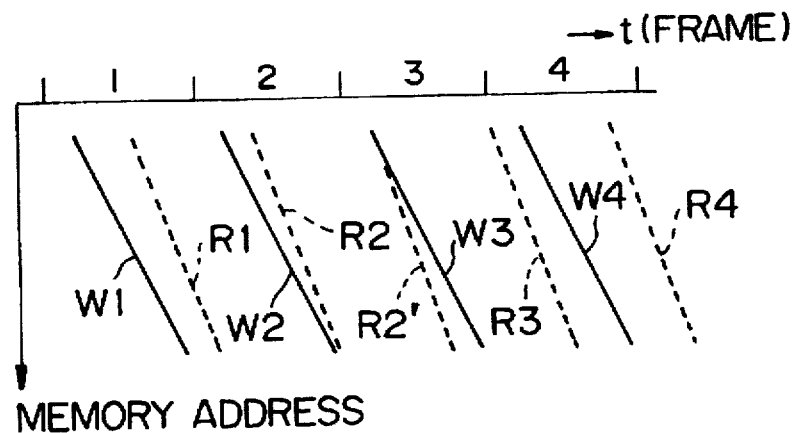
FIGS. 5A to 5C are timing chart,useful in explaining the operation of the scan converter unit of the basic embodiment of the present invention.
Figure 5B:
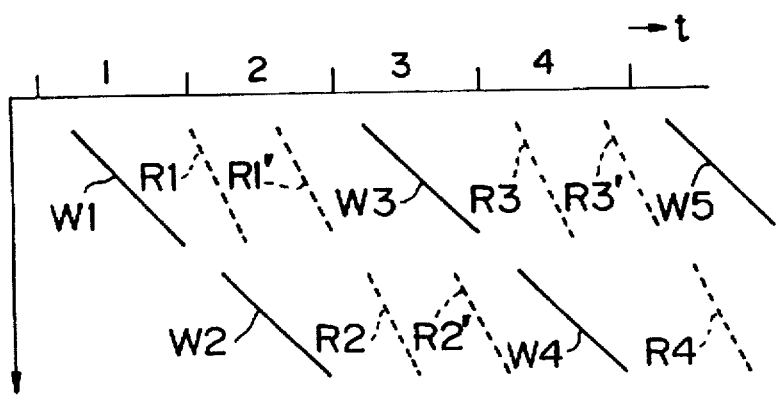
Figure 5C:
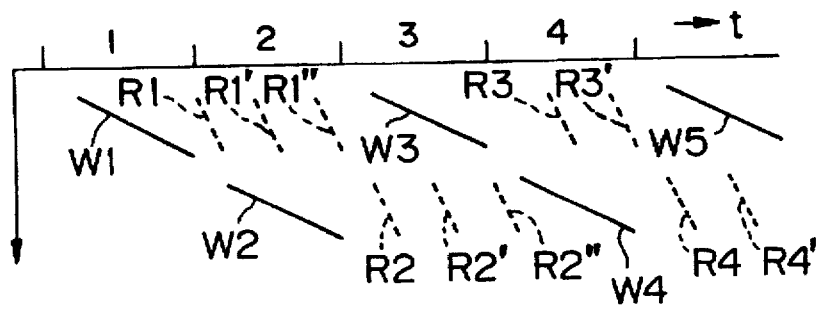

The timing chart of the write/read of the data to/from the digital memory means 36 in the above-mentioned basic embodiment is shown in FIGS. 5A, 5B and 5C. In those figures, the axis of abscissa represents the time (t) in units of the frame period of the input signal, and the axis of ordinate represents the memory addresses.

An example shown in FIG. 5A shows a specific case where the input and output vertical frequencies are 60 Hz and 75 Hz, respectively, and the input and output horizontal frequencies are 80 kHz and 100 kHz, respectively.

An example shown in FIG. 5B shows the specific case where the input and output vertical frequencies are 60 Hz and 120 Hz, respectively, and the input and output horizontal frequencies are 51 kHz and 100 kHz, respectively.

An example shown in FIG. 5C shows the specific case where the input and output vertical frequencies are 60 Hz and 150 Hz, respectively, and the input and output horizontal frequencies are 41 kHz and 100 kHz, respectively.

In FIGS. 5A, 5B and 5C, the solid lines W1, W2, W3, W4 and W5 represent the respective write timing, and the dotted lines R1, R1', R1", R2, R2', R2", R3, R3', R4 and R4' represent the respective read timing. For example, the dotted lines R2, R2' and R2" correspond to the first, second and third read operations for the second write frame, respectively. Hereinabove, the description with respect to FIG. 5 has been completed. The above-mentioned description has been given with respect to the case where both the horizontal and vertical image enlargement ratio of the output reproduced image is set to 1.

The description will hereinbelow be given with respect to the case where the image enlargement ratio is set either equal to or larger than 1, or equal to or smaller than 1. In the case where the horizontal image enlargement ratio is $M_H$ and the vertical image enlargement ratio Mv, the signal relating to the number of picture elements for the output display (Dop) and the signal relating to the number of scanning lines for the output display (Sop) which are respectively input to the above-mentioned terminals 47 and 52 of FIG. 4 are provided so as to fulfill the following Expressions (12) and (13), respectively.

$$D_{OP} = \frac{D_{IP}}{M_H} \quad (12)$$

$$S_{OP} = \frac{S_{IP}}{M_V} \quad (13)$$

The signals relating to the values MH and Mv are input from the outside to the input terminal 13 of the microprocessor 54 shown in FIG. 4, the calculations of Expressions (12) and (13) are carried out in the microprocessor 54, and the resultant signals are, as has already been described, transmitted to the bidirectional bus terminal shown in FIG. 4.

While in accordance with the change in Dop and Sop, as shown in Expressions (14) to (19), both the reading clock frequency fco and the output vertical frequency fvo are changed, the output horizontal frequency $f_{HO}$ is maintained constant.

$$f_{CI} \equiv (D_{IP} + D_{IB})f_{HI} \quad (14)$$

$$f_{CO} \equiv (D_{OP} + D_{OB})f_{HO} \quad (15)$$

$$f_{VO} \equiv \frac{f_{HO}}{S_{OP} + S_{OB}} = \frac{f_{HO}}{S_{IP}/M_V + S_{OB}} \quad (16)$$

$$D_{OB} = f_{CO} T_{HB}$$

$$\therefore f_{CO} = (D_{IP}/M_H + f_{CO}T_{HB})f_{HO} \quad (17)$$

$$\therefore f_{CO} = \frac{f_{HO}D_{IP}/M_H}{1 - T_{HB}f_{HO}} \quad (18)$$

$$= f_{HO}D_{IP}/\{M_H(1 - R_{HO})\} \quad (19)$$

In this connection, $f_{HO}$, $S_{OB}$, $R_{HO}$ and $T_{HB}$ are fixed constants.

In the above Expressions, as described above, $f_{HO}$ is about 100 kHz, $S_{OB}$ is about 50 (refer to Expression (11)), the horizontal blanking period ratio $R_{HO}$ of the output image signal is about ¼ (refer to Expression (9)), and the horizontal blanking period $T_H$ thereof is about 2.5 μsec.

Note that, in FIG. 4, into the positions A and B which are located in the middle of the signal lines between the digital memory means and the horizontal and vertical reset signal input terminals, the pulse delay circuits which have the similar configurations to those of the constituent elements 56 to 59 and the constituent elements 60 to 63 are respectively inserted, whereby the position of the reproduced image can be shifted.

Hereinabove, the description of the concrete embodiment of the scan converter unit of the present invention shown in FIG. 4 has been completed. Next, the description will hereinbelow be given with respect to the concrete embodiment of the display unit of the basic embodiment.

Figure 6:
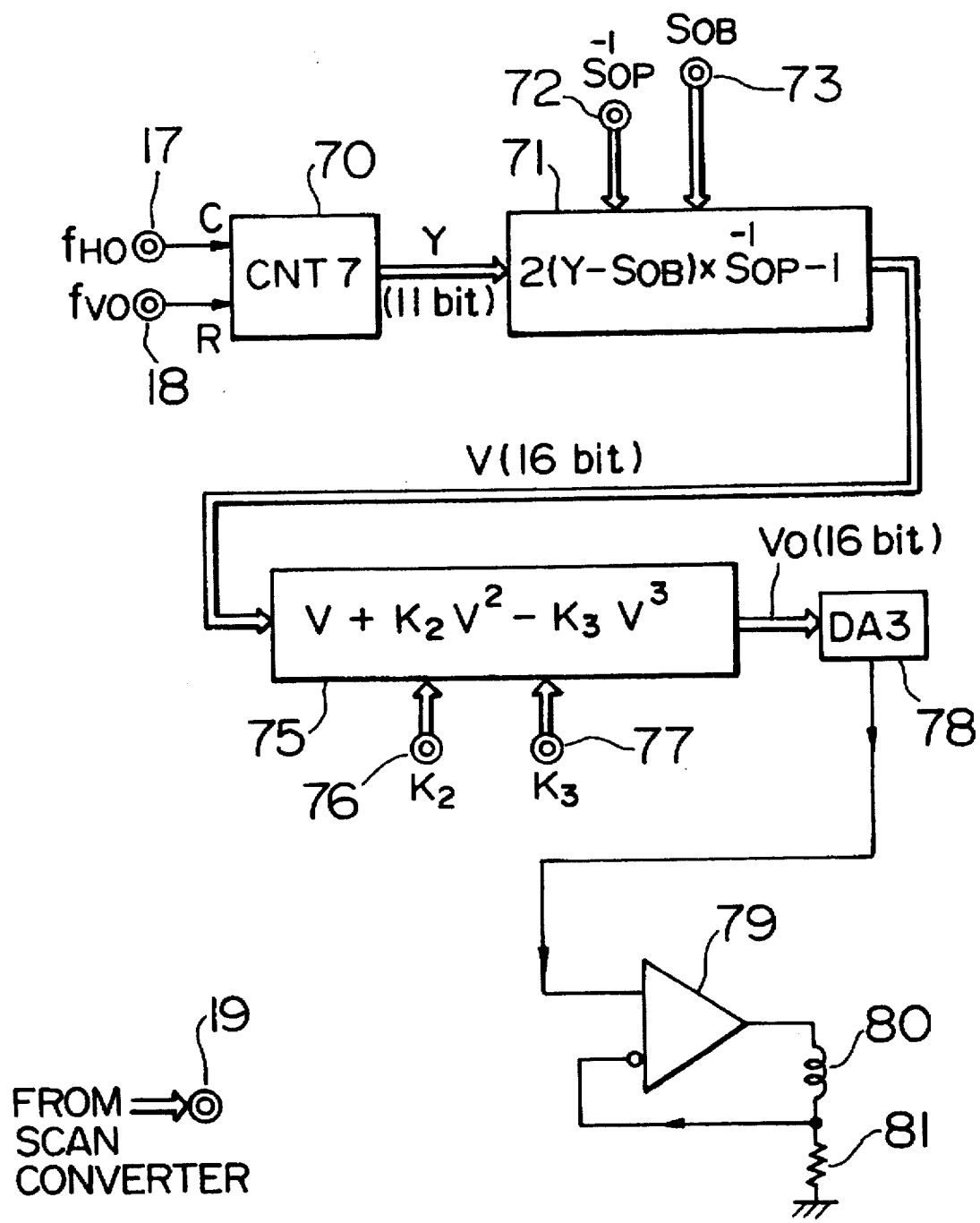
FIG. 6 is a block diagram showing a configuration of a vertical deflection circuit of a display unit of the basic embodiment of the present invention.

FIG. 6 shows a configuration of the wide range frequency correspondence type vertical deflection circuit as the main portion 22 of the display unit of the basic embodiment shown in FIG. 1.

In the figure, the terminals 17, 18 and 19 are the same as those shown in FIGS. 1 and 4. Reference numeral 70 designates a counter which operates to count the input horizontal pulse signal and to be reset by the input vertical pulse signal. From the counter 70, the output signal relating to the scanning line number Y is obtained. Reference numeral 71 designates a coordinate converting circuit which operates to convert the signal relating to the scanning line number Y into the world coordinate V. The world coordinate means the coordinate which has one to one correspondence to the positional coordinate of the reproduced image on the CRT. Reference numeral 75 designates a circuit means for eliminating the second order distortion and the third order distortion which constitutes a circuit means for automatically eliminating a vertical S-shaped distortion as a main portion of the present invention. Reference numeral 78 designates a D/A converter, reference numeral 79 designates a negative feedback amplifier, reference numeral 80 designates a vertical deflecting coil, and reference numeral 81 designates a resistor for detecting a vertical deflection circuit. The voltage developed across the resistor 81 is fed back to an inverted input terminal of the negative feedback amplifier 79. To input terminals 72, 73, 36 and 77, $1/S_{op}$, $S_{OB}$, $K_2$ and $K_3$ are respectively input from the bus terminal 19 of the microprocessor.

The input/output characteristics of the coordinate converting circuit means 71 and the distortion eliminating circuit means 75 are shown in the form of Expressions (20) and (21), $$V = 2(Y - S_{CB})\frac{1}{S_{OP}} - 1 \quad (20)$$

$$V_o = V + K_2 V^2 K_3 V^3 \quad (21)$$

where the relationship of $K_3 \approx 0.5$ $(\sin\theta_v)^2$ is established where $\theta_v$ represents the vertical deflection angle.

Figure 7:
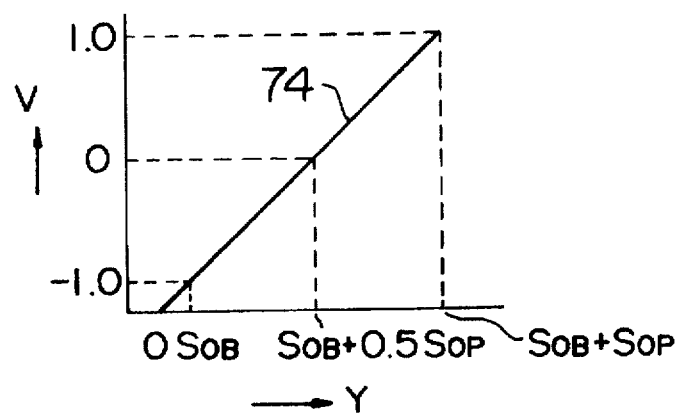
FIG. 7 is a graphical representation useful in explaining the operation of the display unit of the basic embodiment of the present invention.
Figure 8:
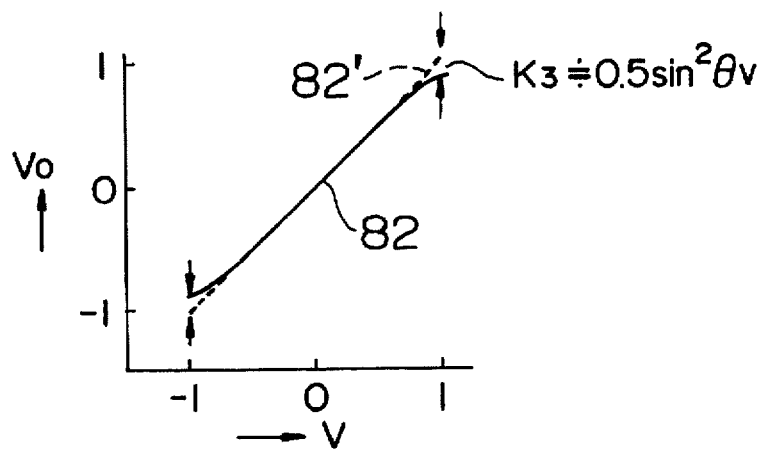
FIG. 8 is a graphical representation useful in explaining the operation of the display unit of the basic embodiment of the present invention.

The characteristics expressed by Expression (20) are shown in the form of a graph of FIG. 7. As can be seen from FIG. 7, the coordinate converting circuit means 71 operates to convert the value Y ($S_{OB}$ to $S_{OB}+S_{op}$) of the image display interval into the value V of the world coordinate (ranging from −1 up to +1). The position at the center of the screen corresponds to the value V of zero. Therefore, with the automatic follow performed irrespective of both the number of scanning lines for the output image display and the output vertical scanning frequency, the vertical amplitude of the reproduced image is kept being fixed. Hereinabove, the description of the coordinate converting circuit means 71 has been completed. In Expression (21) for explaining the elimination of the distortion, the constant $K_2$ is a factor for eliminating the vertical asymmetrical distortion due to the dispersion of distribution of the coil of the deflecting yoke 23 shown in FIG. 1. Normally, the value of $K_2$ is zero. In Expression (21), the constant $K_3$ is a factor for eliminating the S-like distortion. The input/output characteristics expressed in the form of Expression (21) are shown by a solid line 82 of FIG. 8. A dotted line 82' represents the straight line when $K_3$ is zero. The difference between the solid line and the dotted line at each of the end points of the graph is equal to the magnitude $K_3$ of the three order distortion. This value is, as set down with Expression (21), equal to a value about 0.5 times as small as sin $\theta_v$ squared ($\theta_v$: the vertical deflection angle). Therefore, if the type of the CRT to be used is determined, the value of $K_3$ will become a constant value. As a result, the adjustment work in the assembling adjustment process is made unnecessary. In addition, the deflecting coil and the series connected capacitor for correcting the S-shaped distortion, which were required for the prior art to correct the S-shaped distortion, are not employed at all. Therefore, even if the vertical frequency is changed remarkably up to the ratio of 1:3 or more (60 Hz to 180 Hz or more) on the basis of the above Expression (16), the S-shaped distortion is always eliminated stably. In FIG. 6, the description has been given with the calculations of Expressions (20) and (21) assigned to the circuits 71 and 75, respectively, for the sake of convenience of the description. However, the procedure may also be adopted such that those calculations are carried out by the above-mentioned microprocessor 54 shown in FIG. 4 with the circuits 70, 71 and 75 provided collectively. Hereinabove, the description of the example of the concrete configuration of the vertical deflection circuit means 22 of the display unit constituting the basic embodiment, shown in FIG. 1, of the present invention has been completed.

Hereinbefore, the description of the basic embodiment of the present invention has been practically completed. In the description of FIGS. 1 and 4, the input image signal was shown in the form of one analog signal. However, alternatively, the input image signal may be a digital signal. In this case, it is apparent that simply, the A/D converter 34 shown in FIG. 4 can be removed. In addition, in the case where the image signal input is constituted by the three primary color signals of R, G and B, it is apparent that only the image signal transmission systems corresponding to the two channels may be further added. Further, in the case where the input interface of the image signal is of a digital type, it is also apparent that in order to reduce the number of necessary bits of the digital memory 36, the technology of a look-up table may be employed which is well known in the field of the computer technology. In this connection, it is also apparent that the contents of the look-up table may be transmitted to be notified from the computer signal source to the display device via the image signal transmission line for the vertical blanking period of the image signal.

The description of FIGS. 4 and 6 was given on the assumption that the scanning standards of the input signal is based on the non-interlace formula. Then, it is clear that for the input signal based on the interlace formula, the modification of employing the pulse signal having the frequency of $2f_H$ instead of the input pulse signal having the frequency of $f_H$ may be performed.

The value of the vertical blanking period ratio ($R_{VI}$ in Expression (5)) of most of the computer signal sources is in the range of 4%+1%. From the output terminal of the counter 25 shown in FIG. 4, the signal relating to only the sum of ($S_{IP}+S_{IB}$) is obtained. If that sum is multiplied by the fixed value of 0.04, the approximate value of $S_{IB}$ will be obtained. As a result, the approximate value of $S_{IP}$ will also be determined. Then, it is apparent that by utilizing that fact, on the basis of Expression (16), the output vertical frequency may be set.

Figure 9:
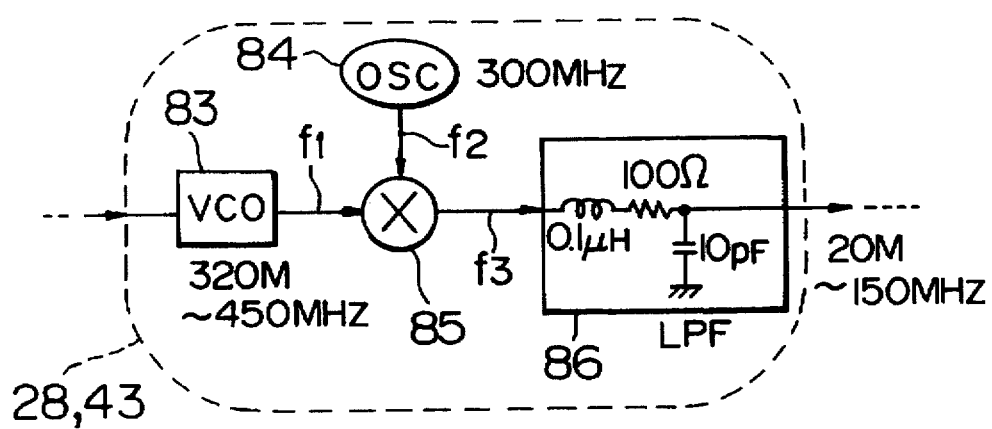
FIG. 9 is a block diagram, partly in circuit diagram, showing a configuration of a voltage controlled oscillator of the present invention.

Next, FIG. 9 shows an example, of the concrete configuration, which is suitable for the application to the voltage controlled oscillator 28 shown in FIG. 4. In general, with respect to the voltage controlled oscillator having a high frequency, it is easy to set the ratio of the upper limit to the lower limit of the oscillation frequency to about 1.5 or so, but it is difficult to set that ratio to a value equal to or larger than 3. In the voltage controlled oscillator shown in FIG. 9, the enlargement of the ratio of the upper limit to the lower limit of the oscillation frequency is effectively promoted utilizing the subtraction function between the frequencies by a mixer circuit. In FIG. 9, reference numeral 83 designates a voltage controlled oscillator having an oscillation frequency f1 of 320 MHz to 450 MHz, reference numeral 84 designates a fixed oscillator having a fixed oscillation frequency f2 of 300 MHz, reference numeral 85 designates a mixer circuit, and reference numeral 86 designates a low-pass filter (an LPF) which operates to transmit the signal component having a frequency equal to or lower than 150 MHz and also block the signal component having a frequency equal to or higher than 300 MHz. In the output of the mixer circuit 85, the signal components respective frequencies of which are (f1+f2) and (f1–f2) appear. Since the LPF 84 blocks the signal component having the frequency of (f1+f2), only the signal component having the frequency of (f1–f2) is output therefrom. The upper and lower limits of the frequency of (f1–f2) are respectively 150 MHz and 120 MHz, and thus, the ratio of the upper limit to the lower limit takes a value equal to or larger than 3. Therefore, the voltage controlled oscillator shown in FIG. 9 can be employed as each of the voltage controlled oscillators 28 and 43 shown in FIG. 4.

Hereinabove, the description of FIG. 9 and the detailed description of the basic embodiment of the present invention have been completed.

Figure 10:
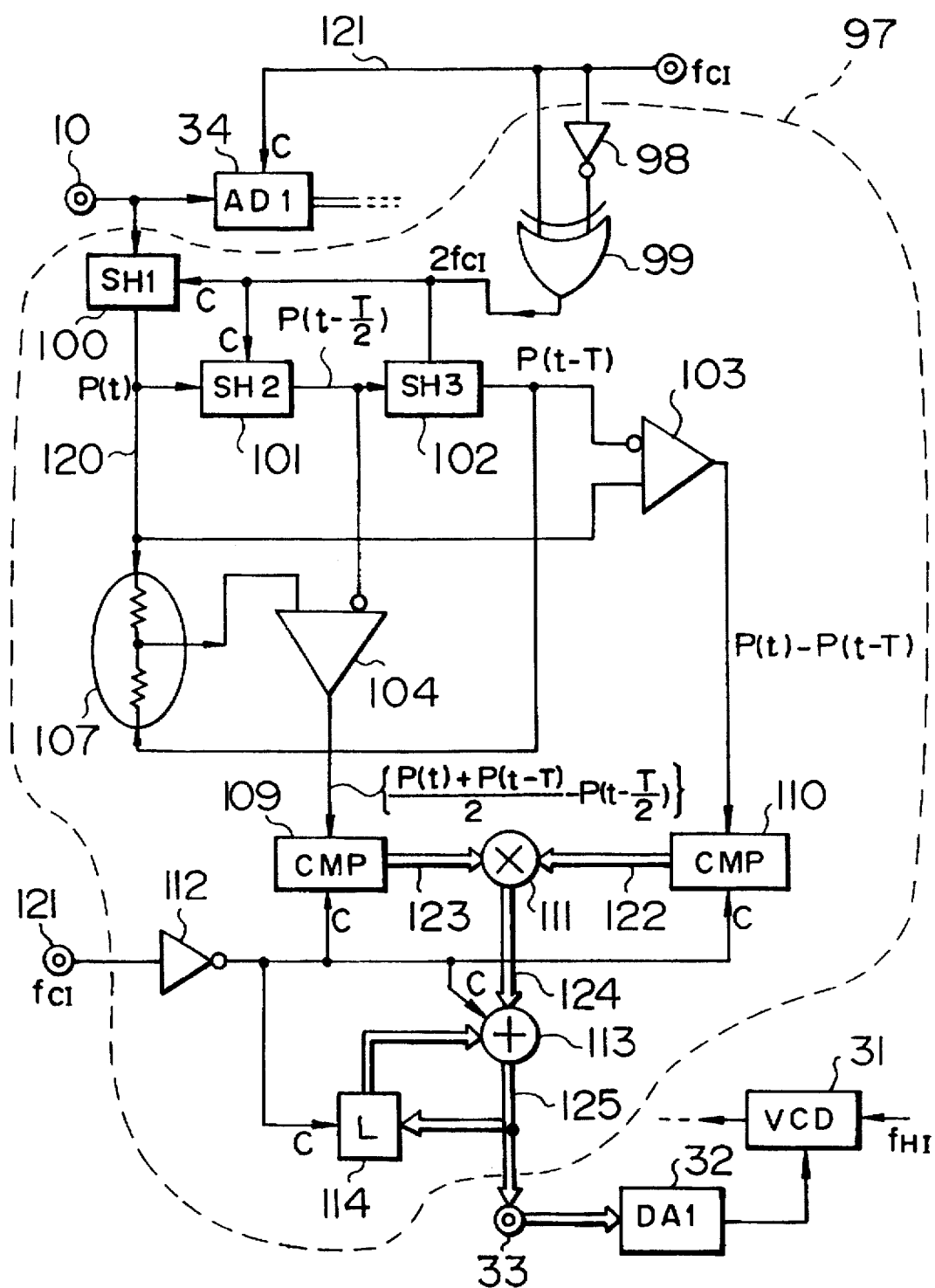
FIG. 10 is a block diagram, partly in circuit diagram, showing a configuration of a circuit for detecting a phase shift of a sampling clock of the present invention.

Next, a modified embodiment of the present invention will hereinbelow be described with reference to FIG. 10. The modified embodiment shown in FIG. 10 is constructed in such a way as to automatically set the phase of the sampling clock which is to be input to the A/D converter 34 shown in FIG. 4. The constituent elements illustrated outside a dotted line 97 in FIG. 10 are the same as those described with reference to FIG. 4. On the other hand, the constituent elements illustrated inside the dotted line 97 constitute a circuit means for detecting a phase shift of the sampling clock.

Figure 11:
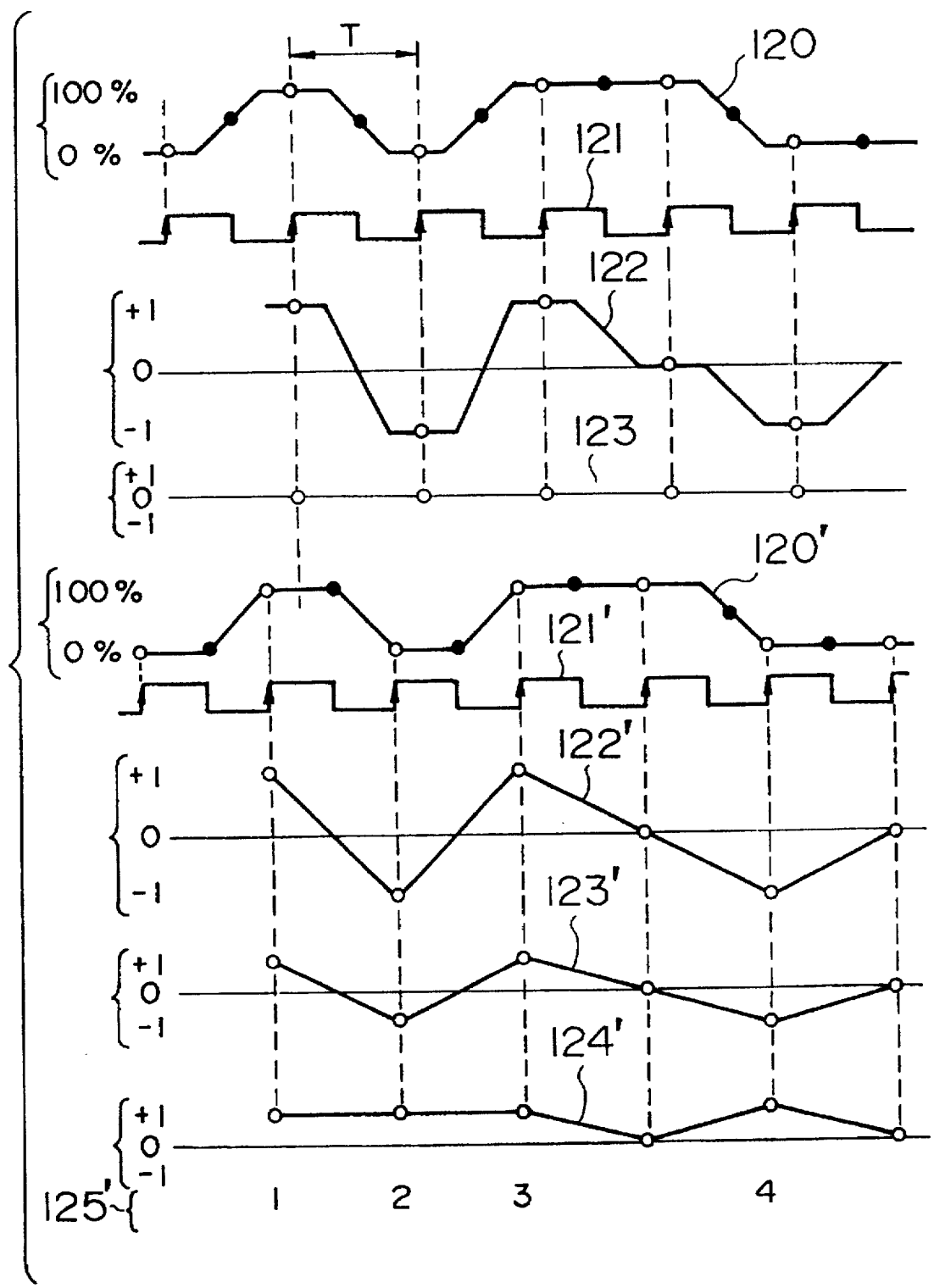
FIG. 11 is a view useful in explaining the states of a sampling clock phase of the present invention.

In FIG. 10, the waveforms at individual nodes 120, 121, 122, 123, 124 and 125 are designated by the same reference numerals in the waveform chart shown in FIG. 11 (the axis of abscissa represents the time base and T represents one clock of $f_{CI}$). The waveforms 120 to 123 of FIG. 11 show the case where the phase of the sampling clock is normal, whereas the waveforms 120' to 125' shows the case where the sampling clock of interest leads the normal sampling clock by a phase angle of 90 degrees. The description will hereinbelow be given with respect to FIGS. 10 and 11.

Reference numeral 98 designates an inverter having delay time of about 1.5 nsec, and reference numeral 99 designates an exclusive OR circuit from an output terminal of which the higher harmonics pulse signal ($2f_{Cf}$) having a pulse width 2 times as large as that of 1.5 nsec. Reference numerals 100, 101 and 102 designate sample and holders, respectively, reference numerals 103 and 104 designate differential amplifiers, respectively, reference numeral 107 designates a circuit for outputting a mean value of the two inputs, and reference numerals 109 and 110 designate comparators each level of output signals of which takes any one of three values (i.e., +1, 0 and −1). In addition, reference numeral 111 designates a multiplier, reference numeral 112 designates an inverter, reference numeral 113 designates an adder, and reference numeral 114 designates a latch. In the output terminals 122 and 123 of the comparators 110 and 109, the signals having the respective waveforms shown in FIG. 11 appear. In the case where the phase of the sampling clock is normal, the waveforms 122 and 123 are obtained, and in the case where the sampling clock of interest leads the normal sampling clock by the phase angle of 90 degrees, the waveforms 122' and 123' are obtained.

Since when the phase of the sampling clock is normal, the level of the waveform 133 is always zero, the level of the output signal 124 of the multiplier 111 in the subsequent stage is also zero. Therefore, the level of the output signal of the adder 113 is not changed at all.

On the other hand, the level of the waveform 123' in the case where the phase lead of 90 degrees is non-zero. Therefore, the output 124' of the multiplier 111 in the subsequent stage has the waveform 124' shown in FIG. 11. As a result, the level of the output of the adder 113 in the subsequent stage is increased as shown in the waveform 125' of FIG. 11 because both the latch 114 and the adder 113 operate as a digital integrating circuit. Now, in FIG. 10, as the level of the output of the adder 113 is increased, the level of the output of the D/A converter 32 in increased, so that the delay time of the voltage controlled delay element 31 is decreased. The output pulse signal of the voltage controlled delay element 31 must be in phase with the input signal to the phase detector 27 shown in FIG. 4. Therefore, the phase of the input signal of the voltage controlled delay element 31 is controlled so as to be relatively delayed. That is, the phase of the output clock signal of the first PLL constituted by the constituent elements 27, 28 and 29 is controlled so as for the assumed phase lead of 90 degrees to be compensated. That is, the phase of the sampling clock signal is stabilized in a negative feedback manner.

Accordingly, with the present arrangement, the automatic stabilization of the phase of the sampling clock signal can be attained.

As shown in FIG. 10, assuming that the input image signal is P(t) and the clock period is T, the signal at the node 122 is approximately proportional to P(t)−P(t−T), i.e., the first order difference. In addition, the signal at the node 123 is approximately proportional to 0.5P(t)+0.5P(t−T)−P(t−0.5T), i.e., the second order difference. As a result, the function of the above-mentioned phase shift detector means is provided by multiplying the first order difference by the second order difference.

Some of a certain sort of the computer signal sources are of a type in which the horizontal synchronous signal is also commonly transmitted through the line for transmitting the image signal. For the signal sources of this sort, as the input signal of the present detector means, instead of the image signal, the horizontal synchronous signal may be used. Hereinabove, the description of the present embodiment has been completed.

Figure 12:
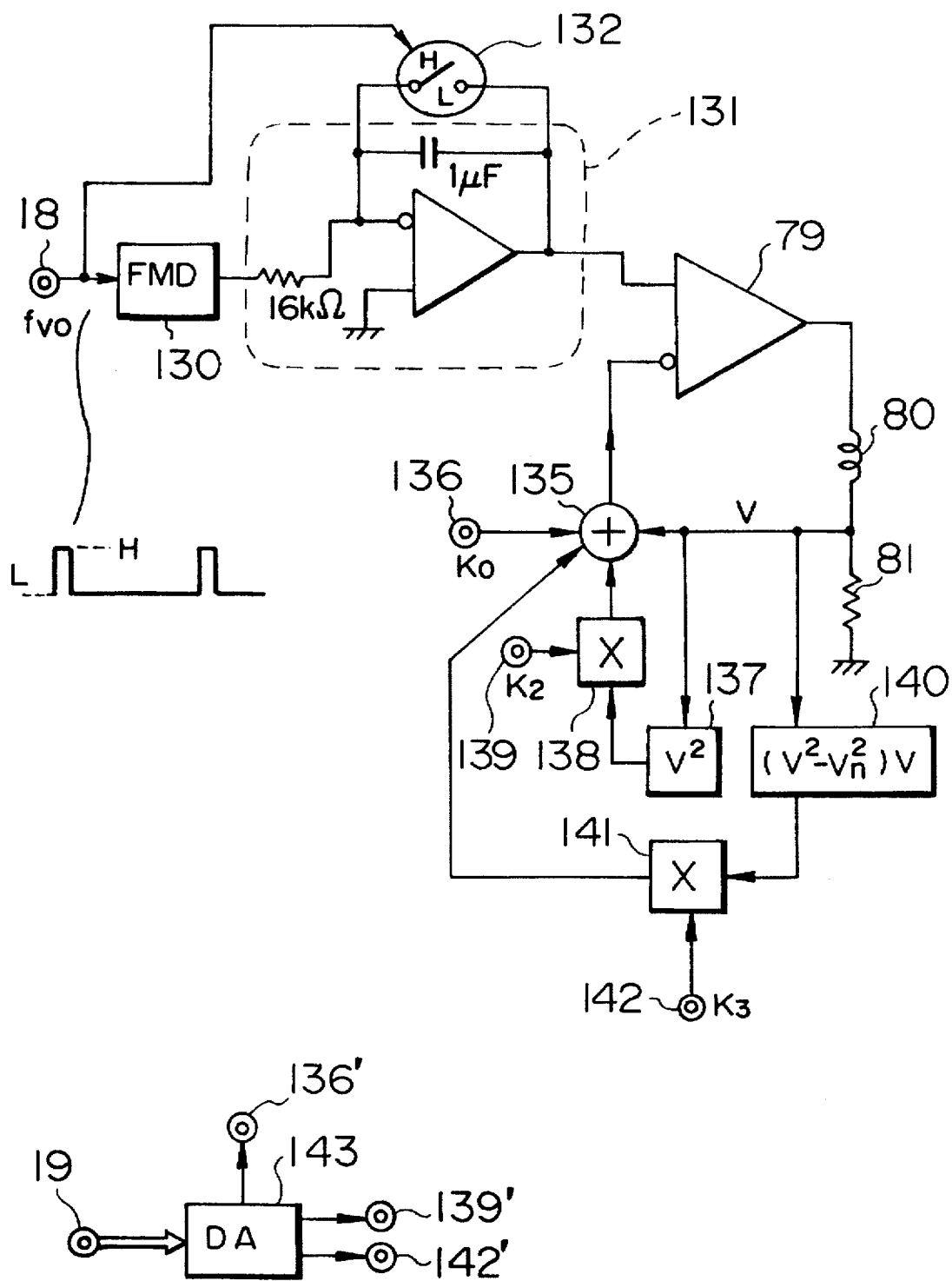
FIG. 12 is a block diagram, partly in circuit diagram, showing a configuration of a modification of the vertical deflection circuit of the display unit of the present invention.

FIG. 12 shows a configuration of a modified embodiment of the vertical deflection circuit means, shown in FIG. 6, of the display unit in the scalable display device of the present invention. In the figure, the constituent elements 18, 19, 79, 80 and 81 are the same as those shown in FIG. 6. Reference numeral 130 designates a frequency discriminator which operates to discriminate the frequency of the input vertical synchronous pulse signal to output a DC voltage proportional to the frequency of the vertical synchronous pulse signal from its output terminal. Reference numeral 131 designates an analog integrating circuit which is provided in the next stage and is constituted by an operational amplifier, a resistor and a capacitor. Therefore, the output of the analog integrating circuit 131 becomes a lowering voltage a lowering speed of which is proportional to the input DC voltage (i.e., the vertical frequency). Reference numeral 132 designates an analog switch which is connected in parallel with the integrating capacitor of the integrating circuit. The analog switch 132 is closed only for a period of time when the input vertical synchronous signal is at a level of "H", and is opened for other periods of time. As a result, from the output terminal of the integrating circuit 131, a lowering saw-tooth-wave signal is obtained which is synchronous with the vertical synchronous signal. The lowering saw-tooth-wave signal is then input to the non-inverted input terminal of the negative feedback amplifier 79. The output terminal of the negative feedback amplifier 79 is connected to the resistor 81 for detecting a current through the vertical deflecting coil 80. In addition, reference numeral 135 designates an adder, reference numeral 136 designates an input terminal for receiving the signal relating to the constant $K_o$, reference numeral 137 designates a square circuit, reference numeral 138 designates a multiplying circuit, reference numeral 139 designates an input terminal for receiving the signal relating to the constant $K_2$, reference numeral 140 designates a circuit for generating an S-shaped distortion correcting waveform, reference numeral 141 designates a multiplying circuit, reference numeral 142 designates an input terminal for receiving the signal relating to the constant $K_3$, reference numeral 143 designates an assembled block having three D/A converters, and reference numerals 136', 139' and 142' designate three output signals of the D/A converter assembled block. In this connection, the output signals 136', 139' and 142' are supplied to the terminals 136, 139 and 142, respectively. The detailed configurations of the square circuit 137 and the S-shaped distortion correcting waveform generating circuit 140 will be described in detail later.

The output voltage V developed across the current detecting resistor 81 is input, together with the signals relating to $K_o$, $K_2V^2$ and $K_3(V^2-V_M^2)V$, to the adder 135, an output terminal of which is connected to the inverted input terminal of the negative feedback amplifier 79. By the function of the negative feedback amplifier 79, the current flowing through the vertical deflecting coil 80 becomes proportional to the rest which is obtained by subtracting $K_o$, $K_2V^2$ and $K_3(V^2-V_M^2)V$ from the input signal having a saw-tooth-waveform.

Therefore, the current has a saw-tooth-waveform, which is approximately proportional to the frequency of the vertical synchronous pulse signal input to the terminal 18 and has a lowering gradient, and also depends on $K_o$, $K_2$ and $K_3$. The signals relating to the values of $K_o$, $K_2$ and $K_3$ are input from the bus signal input terminal 19 and set so as to correct the position of the reproduced image, the second order distortion and the S-shaped distortion, respectively. Thus, the S-shaped distortion is corrected independently of the vertical frequency.

Figure 13:
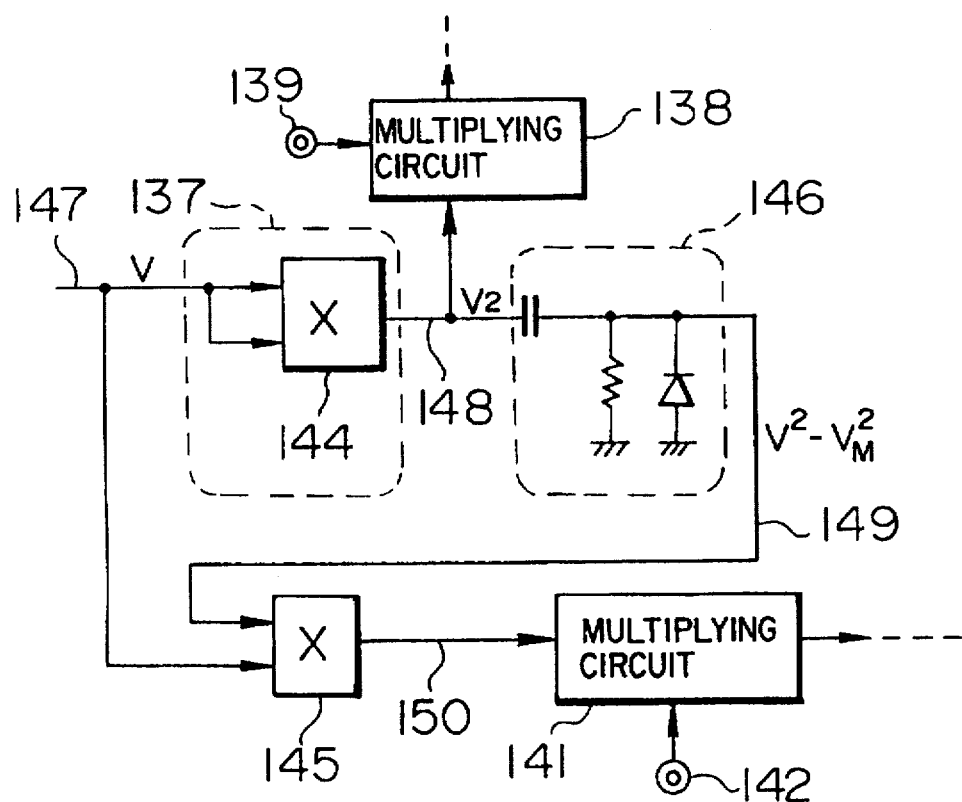
FIG. 13 is a block diagram, partly in circuit diagram, showing the detailed configuration of a part of the modification of the vertical deflection circuit of the display unit of the present invention.

FIG. 13 shows the concrete configurations of the square circuit 137 and the S-shaped distortion correcting waveform generating circuit 140.

Figure 14:
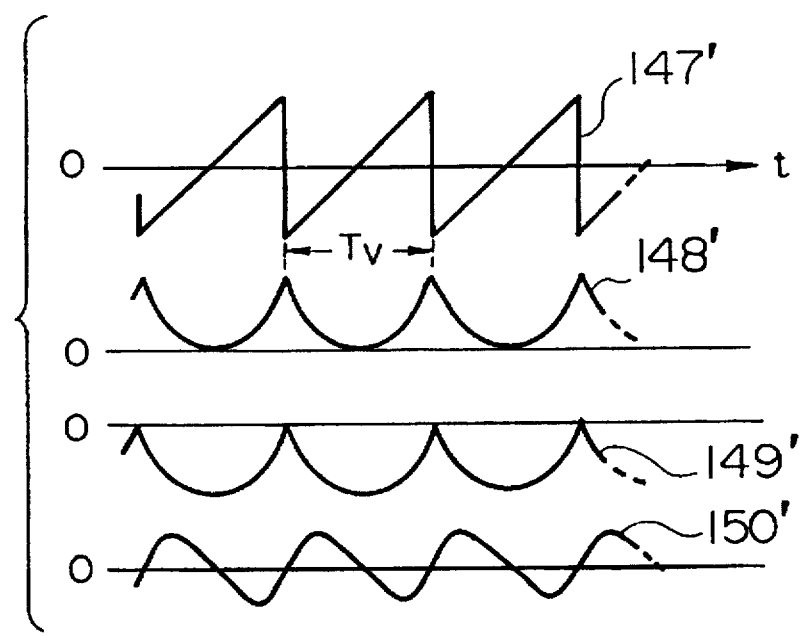
FIG. 14 is a waveform chart useful in explaining the operation of the part of the modification of the vertical deflection circuit of the display unit shown in FIG. 13.

FIG. 14 shows the waveforms of the associated nodes in FIG. 13. That is, the waveforms at the nodes 147, 148, 149 and 150 in FIG. 13 correspond to waveforms 147', 148', 149' and 150' of FIG. 14 with the axis of abscissa as the time base. The input node 147 of FIG. 13 corresponds to the output voltage developed across the current detecting resistor 81. In the figure, reference numerals 144 and 145 designate multipliers, and the constituent elements 138, 139, 141 and 142 are the same as those described with reference to FIG. 12. Reference numeral 146 designates a clamping circuit which is constituted by a DC blocking capacitor, a discharging resistor and a clamping diode. The signals each having the vertical synchronous saw-tooth-waveform (designated by reference numeral 147' in FIG. 14) are respectively input to the two input terminals of the multiplier 144 from an output terminal of which the signal having the parabola waveform (designated by reference numeral 148' in FIG. 14) is output. That is, the multiplier 145 serves as the square circuit. The output signal of the multiplier 145 is subjected to the level shift by the clamping circuit 146 to be output as the signal having the waveform 149' shown in FIG. 14. The signal having the waveform 149' is multiplied by the signal having the saw-tooth-waveform 147' in the multiplier 145 to produce the signal having the S-like distortion correcting waveform, i.e., the waveform 150'. Hereinabove, the description of FIGS. 13 and 14 has been completed. Furthermore, hereinbefore, the description of FIG. 12 has been completed.

Figure 15:
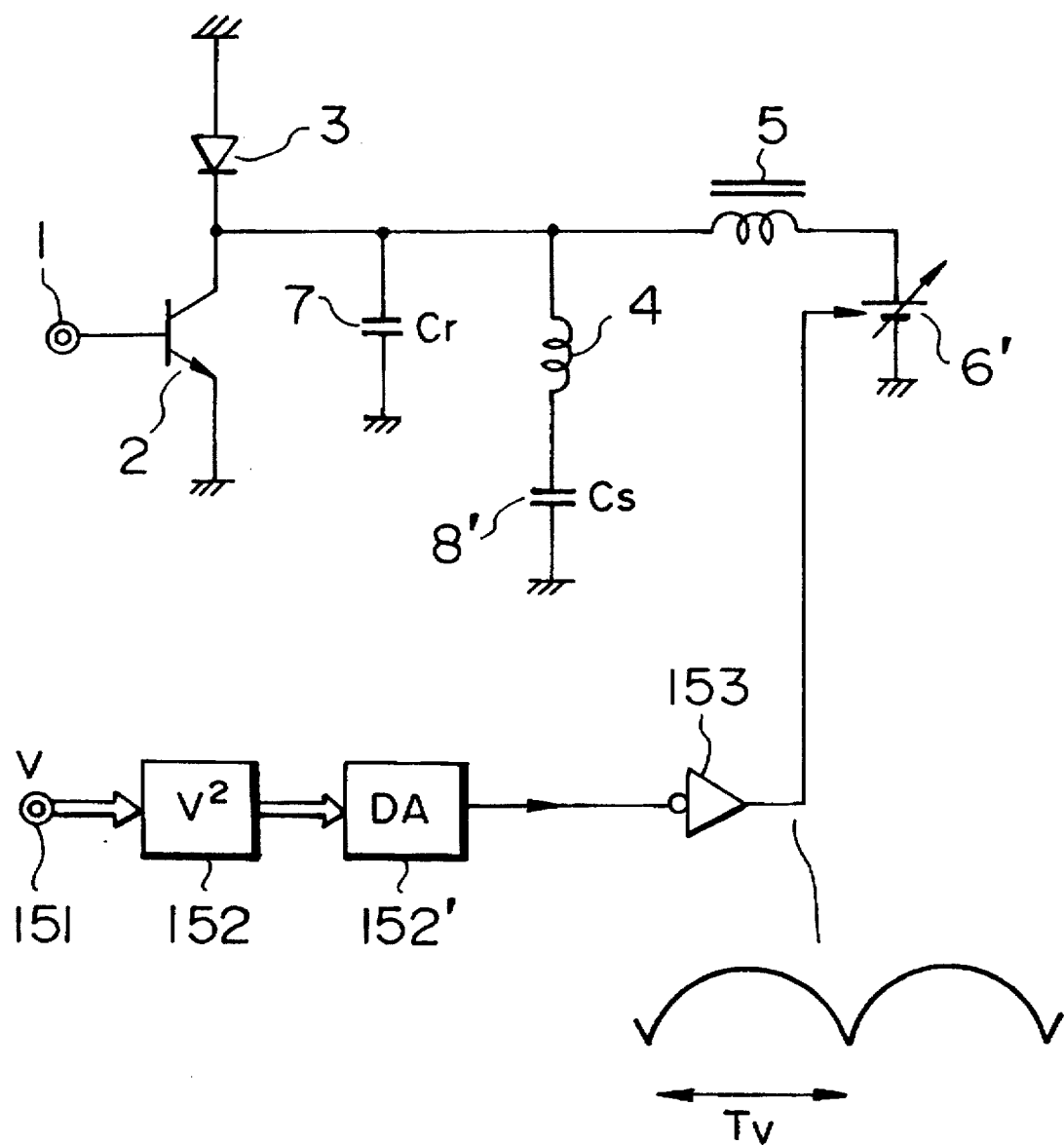
FIG. 15 is a circuit diagram, partly in block diagram, showing a configuration of a modification of a horizontal deflection circuit of the display unit of the present invention.

FIG. 15 shows a configuration of the horizontal deflection output circuit which is suitable for being used with the present invention. In the figure, the constituent elements 1, 2, 3, 4, 5 and 7 are the same as those of the prior art described with reference to FIG. 2. Reference numeral 8' designates a fixed capacitor for correcting the horizontal S-like distortion. While in the prior art, the capacitance value of such a capacitor needed to be switched so as to be inversely proportional to the horizontal frequency squared, in the present invention, the fixed capacitance value may be available. Reference numeral 6' designates a variable power source, the variable range of which can be reduced to be very narrower as compared with that in the prior art (about 10%). A terminal 151 is connected to the output terminal of the circuit 71 shown in FIG. 6. At this terminal 151, there is obtained a saw-tooth-wave like digital voltage which has one to one correspondence to the vertical position on the reproduced image. Reference numeral 152 designates a square calculating circuit, and reference numeral 152' designates a D/A converter from an output terminal of which a parabola wave signal is obtained. Reference numeral 153 designates an inverter from an output terminal of which a vertical synchronous parabola wave signal having a negative polarity is obtained. The voltage of the power source 6' is modulated by the parabola wave signal. The modulation factor thereof is set about 0.5 times as small as the sin $\theta_v$ squared ($\theta_v$: the vertical deflection angle). Hereinabove, the description of FIG. 15 has been completed.

In FIGS. 1 and 4 each showing the basic embodiment of the present invention, the bus input terminal for receiving the associated signal from the outside is employed as the terminal 13. However, this terminal may be connected to the bus terminal of the computer signal source. As a result, the display device can be controlled from the keyboard side of the computer. That is, from this terminal, both the data relating to the scanning line numbers and the data relating to the dot numbers can be supplied with respect to the starting point of the upper left-hand diagonal corner and the ending point of the lower right-hand diagonal. On the basis of those data, both the signal relating to the total number of scanning lines ($S_o$) of the scan converter unit and the signal relating to the total number of picture elements per horizontal period ($D_o$) thereof can be supplied to the terminals 47, 48, 52 and 53 via the terminal 55 described with reference to FIG. 4.

The vertical frequency of the signal source of the computer and the like which are used by being combined with the display device of the present invention is not necessarily set to the value (60 to 80 Hz) of the prior art. Rather, it is recommended that the vertical frequency is reduced while keeping the horizontal frequency of the signal source being fixed. For example, the signal which relates to the moving picture and is to be displayed by five hundred scanning lines is sent at the horizontal frequency of 32 kHz and vertical frequency of 60 Hz, the signal which relates to the still picture and is to be displayed by one thousand scanning lines is sent at the horizontal frequency of 32 kHz and the vertical frequency of 30 Hz, and the signal which relates to the super high definition still picture and is to be displayed by one thousand and five hundred scanning lines is sent at the horizontal frequency of 32 kHz and the vertical frequency of 20 Hz. The display device of the present invention displays those signals on its screen at the horizontal deflection frequency of 100 kHz, and also at the vertical deflection frequencies of about 180 Hz, about 90 Hz and about 60 Hz, respectively. The computer signal source is connected to the display device on the basis of such a formula, whereby it is possible to reduce the amount of interfering radio wave of a high frequency which is radiated from the connecting transmission line to the air. In addition, it is possible to reduce the amount of task which is expended in order to send the image on the computer side and also it is possible to utilize that ability for more effective field.

Figure 16:
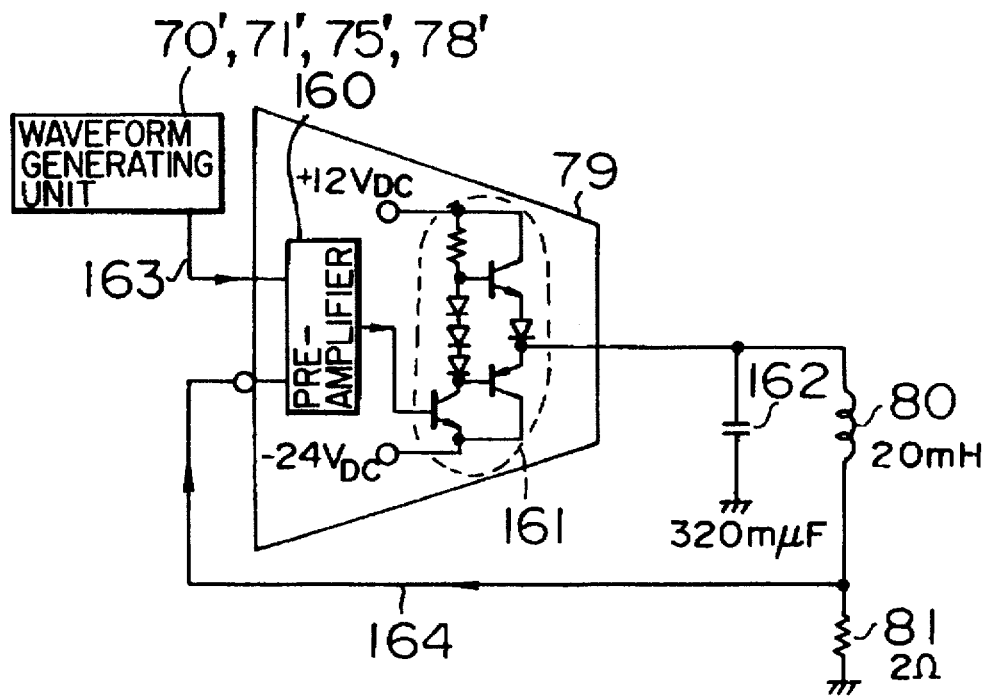
FIG. 16 is a circuit diagram, partly in block diagram, showing a configuration of the vertical deflection circuit of the present invention.

FIG. 16 shows an example of the concrete and detailed configurations of an output unit of the negative feedback amplifier 79 and a pre-boosted flyback circuit for accelerating the vertical retrace lines which are employed in the vertical deflection circuit of the present invention shown in FIG. 6.

Figure 17:
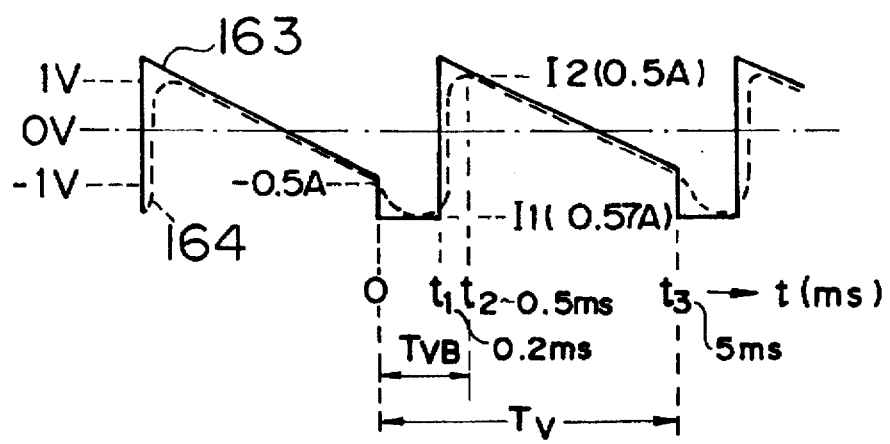
FIG. 17 is a view useful in explaining the operation of the vertical deflection circuit of the present invention.

In the figure, the constituent elements 79, 80 and 81 are the same as those shown in FIG. 6. Reference numeral 160 designates a preamplifier unit of an input unit of the negative feedback amplifier 79, and reference numeral 161 designates an output push-pull amplifier unit. Reference numeral 162 designates a capacitor for the flyback resonance. In addition, reference numerals 70', 71', 75' and 78' designate a waveform generating unit which corresponds substantially to the units 70, 71, 75 and 78 shown in FIG. 6. The output waveform thereof 163 corresponds to a waveform 163 which is shown in FIG. 17 and represented by a solid line. In FIG. 17, the axis of abscissa t represents time, and the axis of ordinate represents the voltage. A waveform 164 represented by a dotted line shows the output voltage developed across the current detecting resistor 81. In FIG. 17, the period of time ranging from t0 up to t2 is the vertical blanking period, and the period of time ranging from t2 up to t3 is the vertical scanning period. For the period of time ranging from t0 up to t1, the voltage of the waveform 63 is about −1.4 V. This voltage is generated from the waveform generating unit in order to provide the vertical retrace line pre-boost. Since generating such a waveform is readily attained by the digital circuit technology, the detailed configuration of the circuit thereof is not illustrated for the sake of simplicity. As shown in FIG. 17, by the negative feedback function of the negative feedback amplifier 79, each of the waveforms of both the current flowing through the vertical deflecting coil and the output voltage 164 developed across the detecting resistor follows the waveform 163. Next, the operation thereof will hereinbelow be described in detail. Time point t=0 corresponds to the leading edge of the vertical synchronous signal. At this time, with respect to the waveforms 163 and 164, the voltage is −1 V and the vertical deflection current is −0.5 A. In the second half of the period of time ranging from t0 up to t1, the vertical deflection current is −0.57 A.

Figure 18:
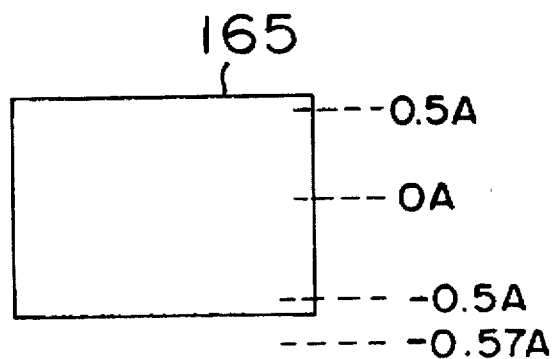
FIG. 18 is a view useful in explaining the operation of the vertical deflection circuit of the present invention.

The relationship between the vertical deflection current and the position on the screen of the display unit is shown in FIG. 18. In FIG. 18, reference numeral 165 designates a screen frame. The current of 0.5 A corresponds to the upper portion of the screen, the current of 0 A corresponds to the central portion of the screen, the current of −0.5 A corresponds to the lower portion of the screen, and the current of −0.57 A corresponds to the outside of the lower portion of the screen frame. Just after the lapse of time t1, the vertical flyback is started. The period of time ranging from t1 up to t2 corresponds to the flyback period. In this connection, for the first half of the period of time ranging from t1 up to t2 when the vertical deflecting coil 80 resonates with the capacitor 162 for the resonance for the half period of about 0.3 msec, the current is caused to flow from the coil 80 into the capacitor 162, and for the second half thereof, the current is caused to flow in the opposite direction, i.e., from the capacitor 162 into the coil 80. The current I1 (−0.57 A) at the time point t1 is reduced along with the lapse of time by about 13% at the time point t2 due to the loss contained in the coil 80 to be the current I2 (0.5 A). The period of time ranging from t2 up to t3 corresponds to the vertical scanning period, and for this period of time, the deflection current is decreased from 0.5 A down to −0.5 A. The value of this amount of attenuation (13%) is, using the value Q of the resonance circuit, given by $0.5 \, \pi/Q$. Hereinabove, the description of the operation has been completed.

The point of the above-mentioned structure is that for the first half of the vertical blanking period (ranging from t0 up to t1), the pre-boost deflection is performed so as for the electron beams to be emitted downward and outside the screen frame, whereby for the second half thereof (ranging from t1 up to t2), the vertical retrace line deflection is attained by only the flyback resonance between the coil 80 and the capacitor 162. The advantage of the present structure is that the special power source of the high voltage for energizing the vertical retrace lines is made unnecessary which was required for the prior art. Here, the description of FIG. 16 has been completed.

Figure 19:
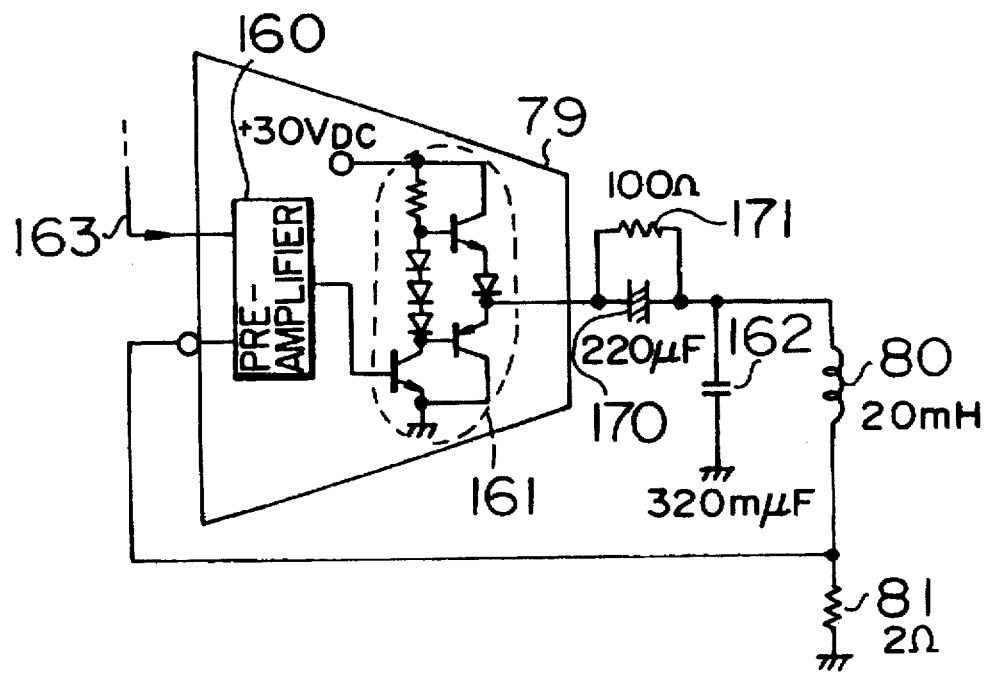
FIG. 19 is a circuit diagram, partly in block diagram, showing a configuration of a modification of the vertical deflection circuit shown in FIG. 16.

FIG. 19 shows a configuration of a modification of FIG. 16. A point of difference in configuration between FIG. 16 and FIG. 19 is that in FIG. 16, both the positive and negative power sources are required for the output push-pull amplifier 161, whereas in FIG. 19, only the positive power source may be required. For this purpose, in FIG. 19, a DC blocking capacitor 170 is additionally provided. Reference numeral 171 designates a resistor which is used to promote the stabilization of the DC operating point of the negative feedback loop.

Having completed the description of the modification shown in FIG. 19, description will hereinbelow be given with respect to an image amplifying circuit (including the image signal amplifier 20 shown in FIG. 1 and the peripheral circuit thereof), which is preferably used with the present invention, with reference to FIG. 20.

Figure 20:
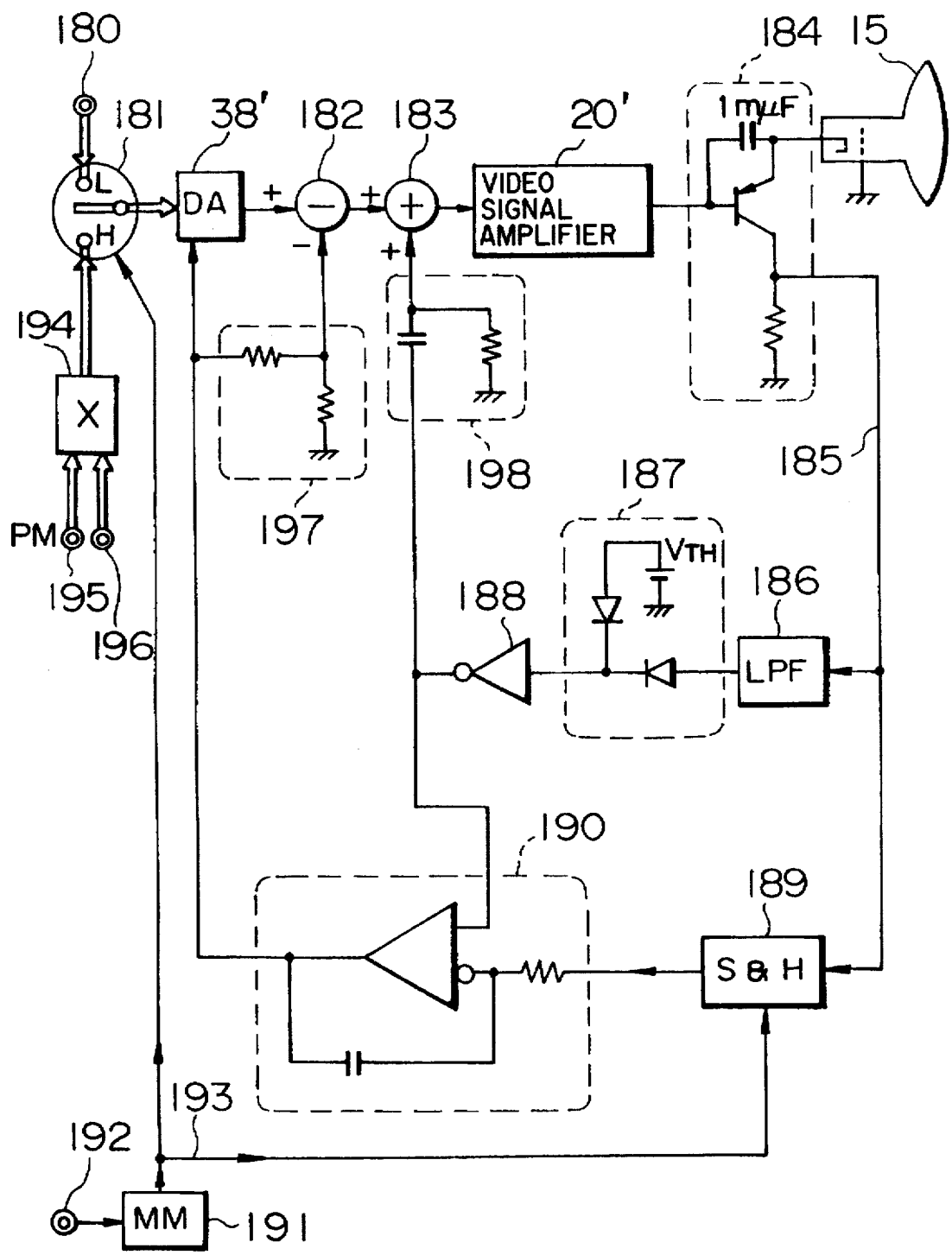
FIG. 20 is a circuit diagram, partly in block diagram, showing a configuration of an image signal processing circuit of the present invention.

In FIG. 20, reference numeral 180 designates an input digital image signal which corresponds to the output signal of the parallel-series converter 37 shown in FIG. 4. Reference numeral 181 designates a digital switch; reference numeral 38' designates a D/A converter; reference numeral 182 designates a subtracter; reference numeral 183 designates an adder; reference numeral 20' designates an image signal amplifier; reference numeral 184, a cathode current detector; reference numeral 15, a CRT; reference numeral 185, an output voltage which is proportional to the cathode current; and 186, a low-pass filter from an output terminal of which the voltage proportional to the average cathode current is obtained. Reference numeral 187 designates a threshold circuit which operates to generate an output signal only when the average cathode current exceeds the maximum value of about 1 A. Reference numeral 188 designates an inversion amplifier, reference numeral 189 designates a sampling and holding circuit, reference numeral 190 designates an integrating circuit utilizing the operational amplification, reference numeral 191 designates a monostable-multivibrator, reference numeral 192 designates a vertical synchronous signal, and reference numeral 193 designates an output pulse signal of the monostable-multivibrator 191. In addition, reference numeral 194 designates a digital multiplier, reference numeral 195 designates an input terminal for receiving a signal relating to a maximum value ($P_M$) of the image signal, and reference numeral 196 designates an input terminal for receiving a signal relating to a constant which is used to correct the dispersion of the luminous efficiency of the illuminant of the CRT 15. In this connection, while both the terminals 195 and 196 are connected to the bus terminal 19 shown in FIGS. 1 and 6, the connection therebetween is omitted here for the sake of simplicity of the illustration. Reference numeral 197 designates an attenuator, and reference numeral 198 designates a high-pass filter. Now, the description of the configuration of the image amplifying circuit of FIG. 20 has been completed, and then the description will hereinbelow be given with respect to the operation thereof.

Figure 21:
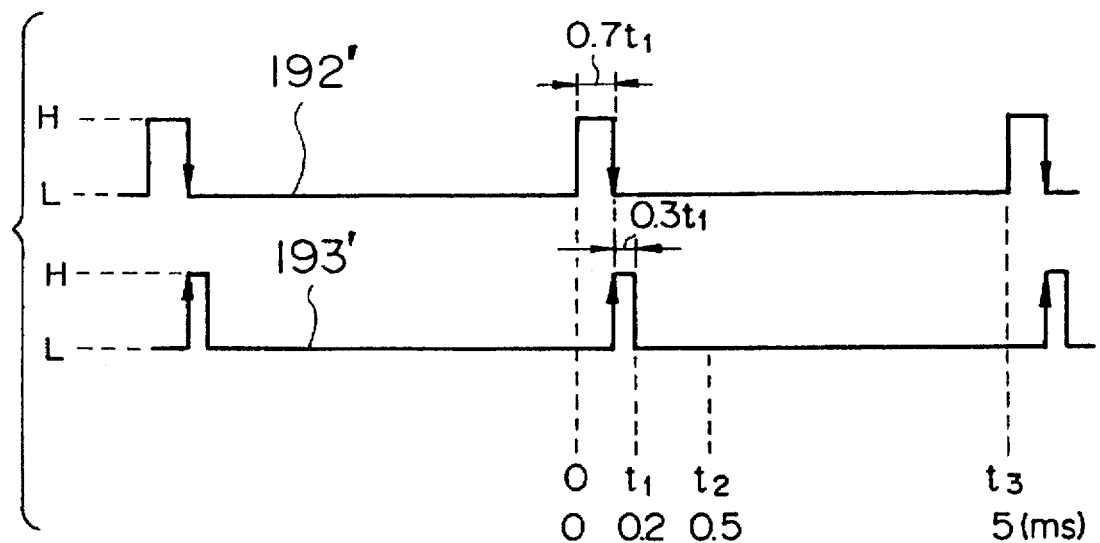
FIG. 21 is a view useful in explaining the operation of the image signal processing circuit of the present invention.
Figure 22:
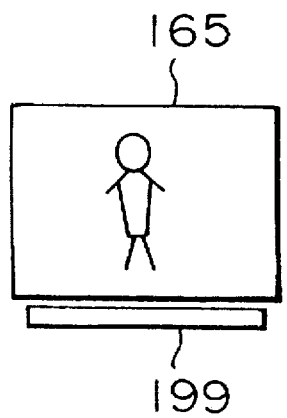
FIG. 22 is a view useful in explaining the operation of the image signal processing circuit of the present invention.

Waveforms 192' and 193' shown in FIG. 21 correspond to the vertical synchronous signal 192 and the output pulse signal 193 of the monostable-multivibrator 191 shown in FIG. 20. As can be seen from FIG. 21, the waveform 193' corresponding to the output pulse signal 193 is at a level of "H" only for the period of time ranging from the time point 0.7 t1 away from the leading edge of the vertical synchronous signal up to the time point t1, and is at a level of "L" for other periods of time. For this period of time, as shown in FIG. 17, the vertical deflection current is about −0.57 A, and therefore, the electron beams are positioned downward and outside the screen frame. In FIG. 22, reference numeral 165 designates the screen frame, and reference numeral 199 designates an image of reference amplitude signal which is displayed so as to be positioned downward and outside the screen frame.

This reference amplitude signal is supplied from the output terminal of the multiplier 194 shown in FIG. 20 to the image amplifying circuit via the digital switch 181. For the period of time when the waveform 193' is at the level of "H"/"L", the switch 181 is connected to the lower side/the upper side. The reference amplitude signal is supplied to the sampling and holding circuit 189 via the constituent elements 38', 182, 183, 20', 184 and 185. The pulse signal 193 is applied to the sampling and holding circuit 189 which outputs a voltage signal proportional to the cathode current corresponding to the reference amplitude signal. In the case where the amplitude of this voltage is excessively large, the level of the output of the integrating circuit 190 in the next stage is gradually lowered. This lowered voltage is applied to a gain control terminal of the D/A converter 38' to attenuate the amplitude of the output image signal from the D/A converter 38'. Therefore, the negative feedback operation is performed so as to prevent the cathode current corresponding to the reference amplitude signal from being excessively large.

Both the subtracter 182 and the attenuator 197 operate so as to correct the fluctuation of the black level accompanying the gain control of the above-mentioned D/A converter.

Therefore, according to the present structure, even in the case where every kind of the input image signal source, the different maximum amplitude is provided, each of the values is input to the terminal 195, whereby the cathode current corresponding to the reference amplitude signal can be kept being fixed. As a result, it is possible to prevent the fluctuation of the reference luminance of the reproduced image.

When the mean value of the cathode current exceeds the threshold (about 1 mA in the present example), the level of the output signal of the threshold circuit 187 is increased, and the level of the output signal of the inversion amplifier 188 in the next stage is lowered. One of the output signals of the inversion amplifier 188 is input to the integrating circuit 190, thereby "slowly" lowering the gain of the D/A converter 38'. The other of the output signals of the inversion amplifier 188 is applied to the adder 183 via the high-pass filter 198, thereby "rapidly" lowering the electric potential of the image signal. Therefore, the mean value of the cathode current is prevented from being excessively large. As a result, the overload of the high voltage circuit is prevented.

While in FIG. 20, there is shown the case where the display device of the present invention is applied to a monochromatic display, it is apparent that the display device of the present invention is also readily applied to a color display. In the case where the display device of the present invention is applied to the color display, it is preferable that the input to the low-pass filter 186 is made the total sum of the cathode currents for R, G and B.

In the case of an application to a color display, there are provided advantages that the levels of the signals which relates to the individual digital constant values for the three primary colors to be input to the terminal 196 are proportionally increased/decreased, whereby the luminance of the image can be proportionally decreased/increased, with the luminance ratio among the three primary colors, i.e., the color reproduction fidelity, being maintained.

Although in the prior art, it was difficult to proportionally increase/decrease the gains while keeping the gain ratio of the three primary colors fixed, in the present invention, this is, as described above, readily attained.

The description of the image amplifying circuit of the present invention of FIG. 20 has been now completed.

As one example of a modification of the scan converter unit in the basic embodiment of the present invention shown in FIG. 4, in the case where the horizontal frequency of the input signal is near the single output horizontal frequency, the horizontal synchronous signal to be input to the terminal 11 can be substituted for the source of the input signal to the phase detector 42, i.e., the pulse generator 41. In this case, naturally, both the output vertical frequency converter means and the vertical blanking period ratio converter means are made unnecessary.

Figure 23:
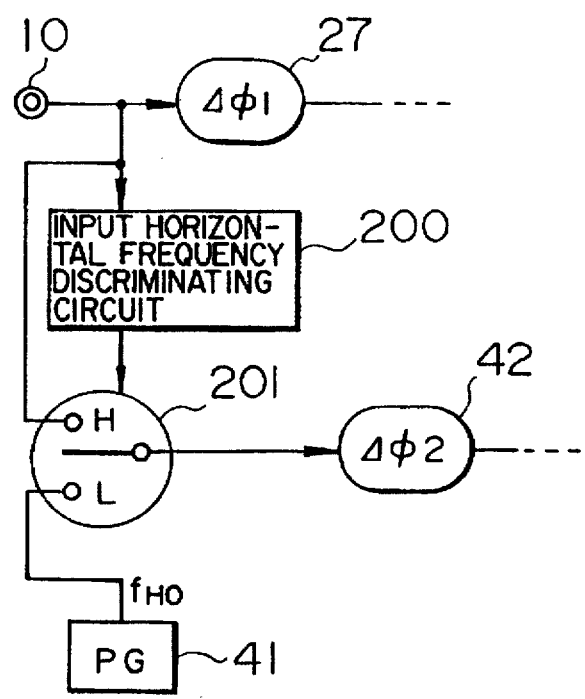
FIG. 23 is a block diagram showing a configuration of the modified portion of the basic embodiment of the present invention.

FIG. 23 shows a configuration of the above-mentioned modification. Now, in FIG. 23, there is shown only a modified portion. In the figure, the constituent elements 11, 27, 41 and 42 are the same as those shown in FIG. 4. Reference numeral 200 designates an input horizontal frequency discriminating circuit. In the case where in the input horizontal frequency discriminating circuit, the input horizontal frequency is high and close to Ho, the level of the output signal of that circuit goes to "H". On the other hand, in the case where the input horizontal frequency is lower than Ho, the level of that output signal goes to "L". Reference numeral 201 designates a switch by which in accordance with the level of "H"/"L", the input to the phase detector 42 is selected. The description of the modification shown in FIG. 23 has been now completed.

Figure 24:
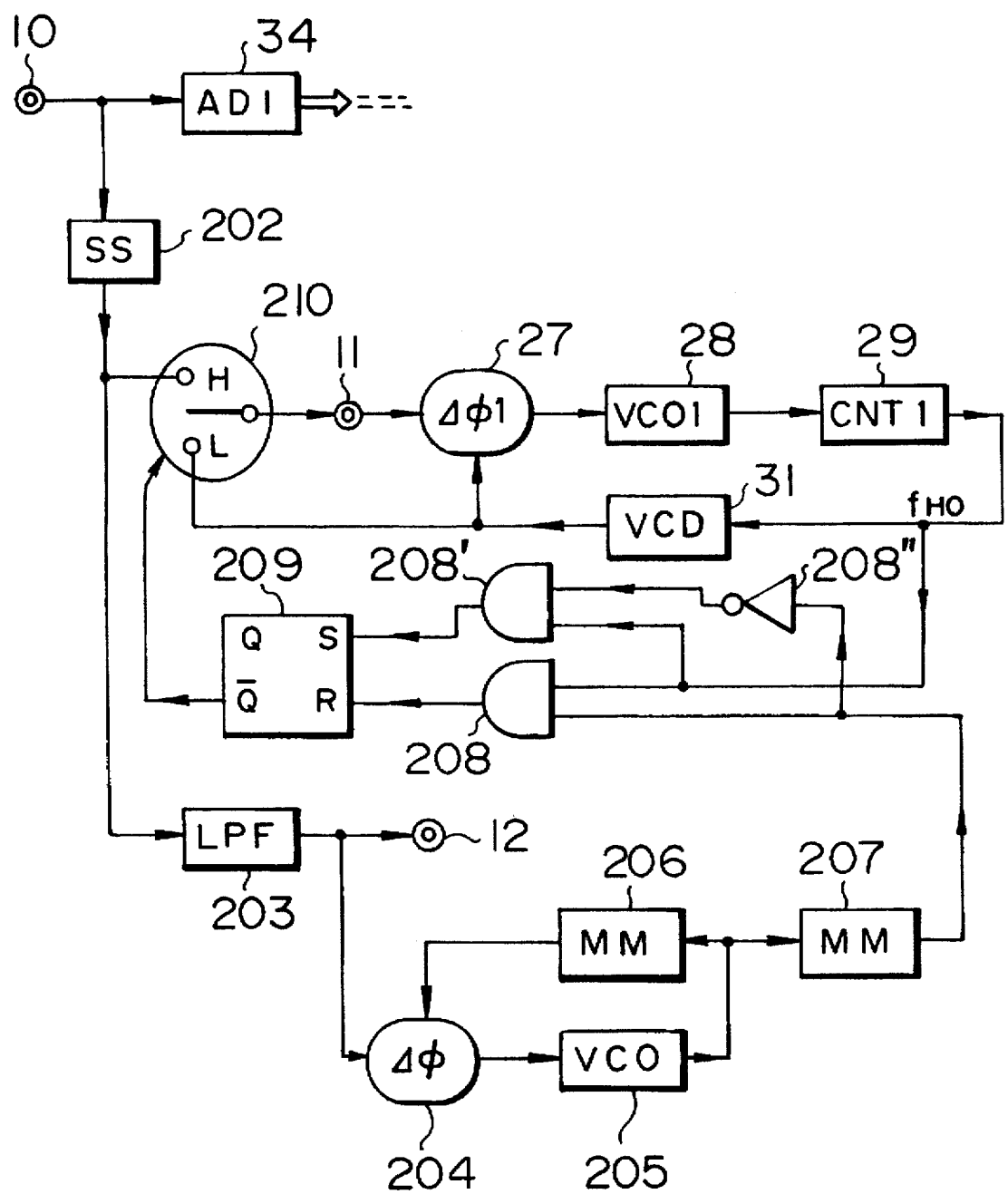
FIG. 24 is a block diagram showing a configuration of the modified portion of the basic embodiment of the present invention.

FIG. 24 shows a configuration of another modified embodiment. The basic embodiment of the present invention shown in FIG. 4 was constructed in such a way that the image signal 10, the horizontal synchronous signal 11 and the vertical synchronous signal 12 were separately input. However, in the image signal source of a certain sort, so-called sync-on-picture format is used in which the horizontal and vertical synchronous signals are supplied with those superimposed on the image signal. FIG. 24 shows a configuration of a modification which is obtained by partially modifying the configuration of FIG. 4 in order to cope with such a case.

In the figure, the constituent elements 10, 11, 12, 34, 27, 28, 29 and 31 are the same as those shown in FIG. 4. Reference numeral 202 designates a well known synchronous separation circuit, and reference numeral 203 designates a low-pass filter from which the vertical synchronous signal 12 is output. Reference numeral 204 designates a phase detector, reference numeral 205 designates a voltage controlled oscillator, and reference numeral 206 designates a monostable-multivibrator. In this connection, the constituent elements 204, 205 and 206 constitute the vertical PLL. Reference numeral 207 designates a monostable-multivibrator, reference numeral 208 and 208' designates AND gates, reference numeral 208" designates an inverter, reference numeral 209 designates a sort of set-reset flip-flop, and reference numeral 210 designates a switch.

Figure 25:
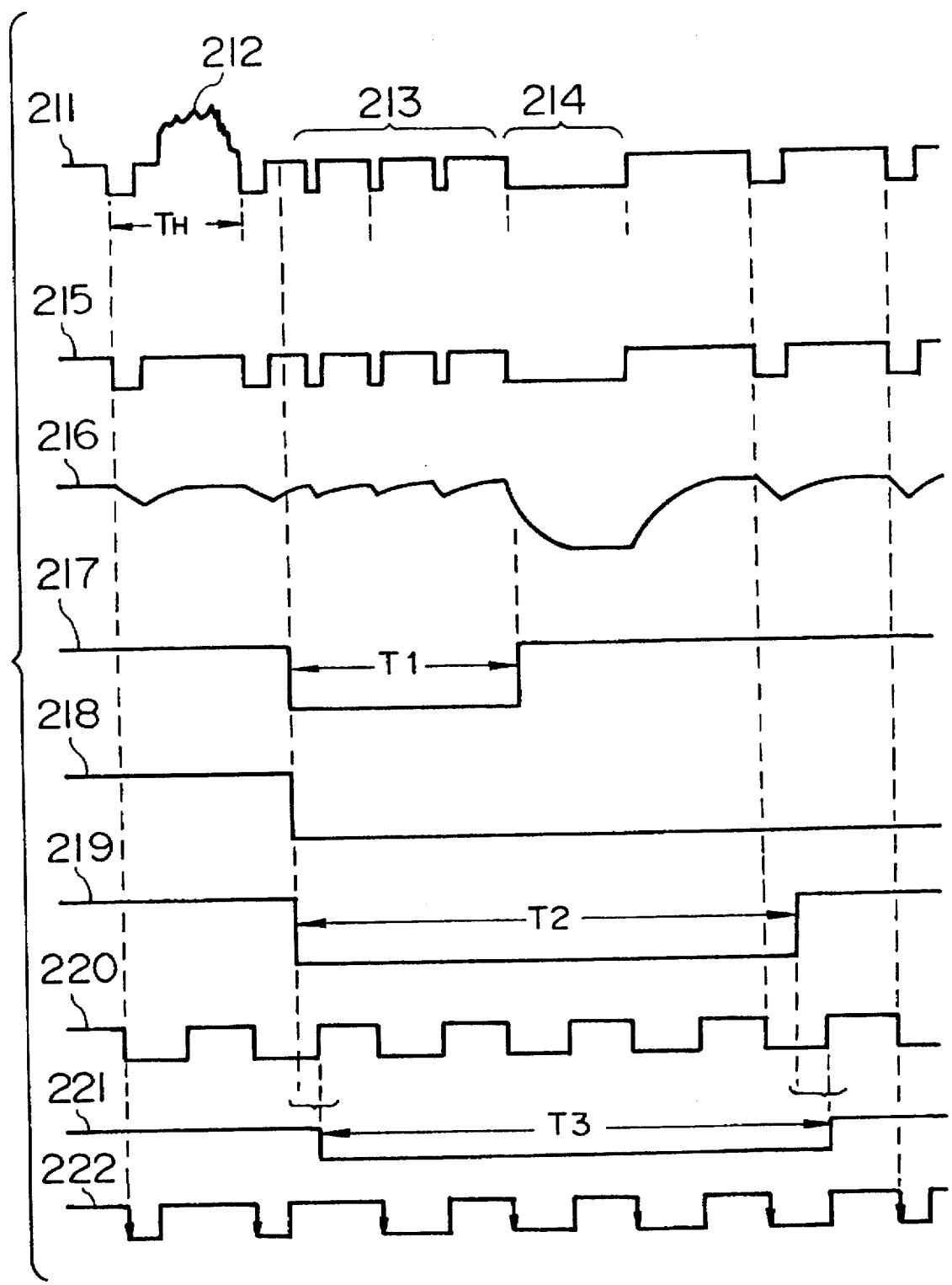
FIG. 25 is a waveform chart useful in explaining the operation of the modified portion of the basic embodiment shown in FIG. 24.

The operation of the modified embodiment of FIG. 24 will hereinbelow be described on the basis of a waveform chart of FIG. 25. In FIG. 25, reference numeral 211 designates an image signal input to the terminal 10, reference numeral 212 designates an image signal displayed on the lower end of the screen, reference numeral 213 designates a horizontal synchronous pulse abnormal interval, and reference numeral 214 designates a vertical synchronous pulse interval. In addition, reference numeral 215 designates an output signal of the synchronous separation circuit 202, reference numeral 216 designates an output signal of the LPF 203, reference numeral 217 designates an output signal of the monostable-multivibrator 206, and reference numeral 218 designates an input signal of the monostable-multivibrator 206. The width T1 of the output pulse signal of the monostable-multivibrator 206 is set wider than the abnormal interval 213 of the input horizontal synchronous pulse signal. Reference numeral 219 designates an output signal of the monostable-multivibrator 207 a pulse width T2 of which is set wider than the sum of the intervals 213 and 214. Reference numeral 220 designates an output signal of the voltage controlled delay element 31, and reference numeral 221 designates an output signal of the SR flip-flop 209 the timing of a pulse width T3 of which is slightly delayed from that of the pulse width T2. The reason is that by the function of the AND gates 208 and 208', the reset timing of the SR flip-flop 209 is delayed. As a result, the switching timing of the switch 210 can be made near the fall point of the waveform 222. That is, the switch 210 can be switched with the detection side edge timing of the phase detector 27 avoided. The switch 210 is connected to the lower side only for the interval of the pulse width T3, and is connected to the upper side for other intervals. Therefore, from the output terminal of the switch 210, a horizontal pulse 222 is obtained in which the timing is arrayed. As can be understood from the above-mentioned description, by adopting the configuration shown in FIG. 24, the present invention can also cope with the image signal having the sync-on-picture formula.

Figure 26:
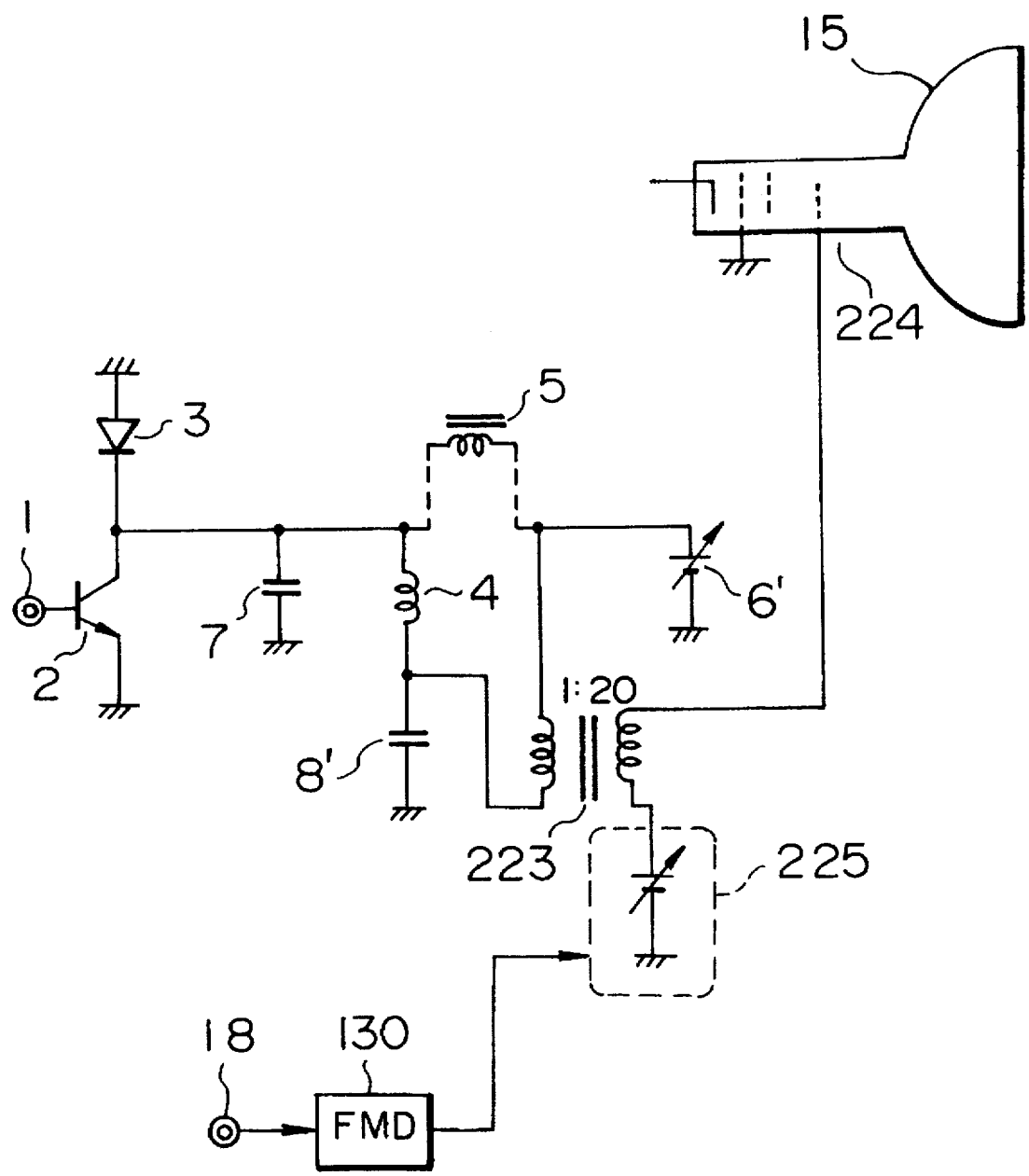
FIG. 26 is a circuit diagram showing a configuration of a focus circuit of the present invention.

Next, FIG. 26 shows a configuration of a horizontal dynamic focus circuit which is suitable for being used with the present invention. In the figure, the constituent elements 1, 2, 3, 4, 6', 7, 8' and 15 are the same as those shown in FIG. 15. Reference numeral 223 designates a focus transformer having a turn ratio of about 1:20. Reference numeral 224 designates a focus electrode of the CRT 15, and reference numeral 225 designates a controllable power source. The constituent elements 18 and 130 are the same as those shown in FIG. 12. Next, the operation of the horizontal dynamic focus circuit of FIG. 26 will hereinbelow be described. In the input terminal of the focus transformer 223, the parabola wave signal having about 40 Vpp is generated. In the output terminal of the focus transformer 223, the parabola wave signal having about 800 Vpp which is a turn ratio multiple of about 40 Vpp. This voltage is applied to the focus electrode 224 to improve the uniformity of the focus of the reproduced image. The controllable power source 225 operates to supply a static focus voltage. This voltage is controlled by the voltage (i.e., the output of the frequency discriminator 130) which is proportional to the vertical frequency. More specifically, that voltage is controlled in such a way that at the vertical frequency of about 60 Hz, the best focus state is provided, and as the vertical frequency is increased, the reproduced image is defocused. The fact that the vertical frequency is high means in the present invention that as described above, the number of scanning lines is small. In the case where the number of scanning lines is small, the so-called Moiré interference occurs between the shadow mask and the scanning line structure of the CRT in the best focus state. By defocusing the reproduced image, it is possible to eliminate this Moiré interference. Hereinabove, the description of FIG. 26 has been completed. Incidentally, according to the present structure, since the power source current can be supplied from the variable power source 6' via the primary side of the focus transformer 223, the choke coil 5, which was required for the prior art, can be removed.

Figure 27:
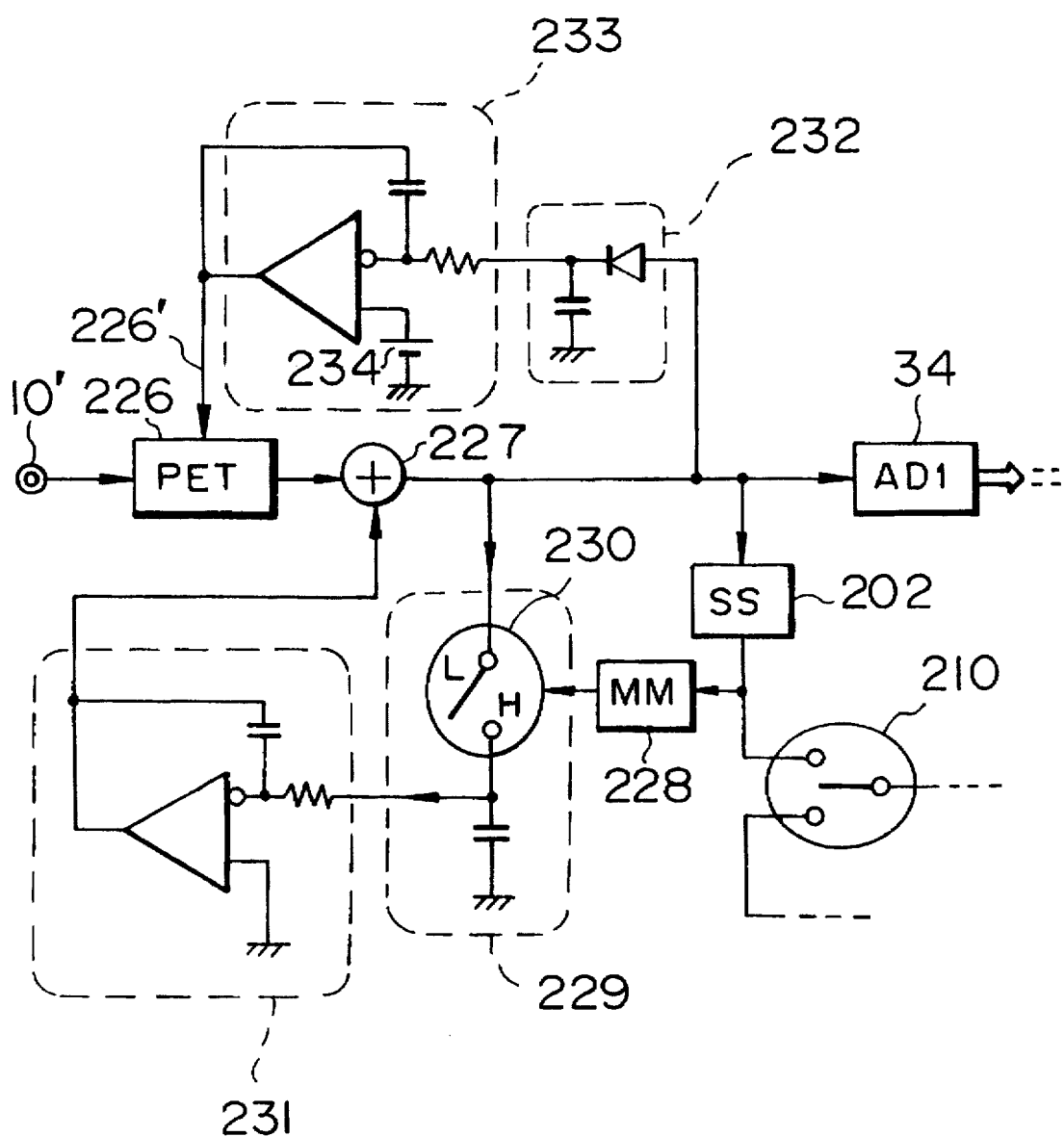
FIG. 27 is a circuit diagram, partly in block diagram, showing a configuration of the image signal processing circuit of the present invention.

The image signal input interface of the display device of the present invention may be via an optical fiber. An input circuit which is preferable in this case is shown in FIG. 27. In the figure, the constituent elements 34, 202 and 210 are the same as those shown in FIG. 24. Reference numeral 10' designates an input terminal for receiving an optical image signal, and reference numeral 226 designates the well known photoelectric transform circuit the gain of which is controlled by the voltage at a node 226'. In addition, reference numeral 227 designates an adder, reference numeral 228 designates a monostable-multivibrator, reference numeral 229 designates a sampling and holding circuit, reference numeral 230 designates a switch, reference numeral 231 designates an integrating circuit, reference numeral 232 designates a circuit for detecting amplitude of the reference signal, reference numeral 233 designates an integrating circuit, and reference numeral 234 designates a voltage power source for setting a target value of amplitude of the reference signal (e.g., 1 $V_{DC}$).

Figure 28:
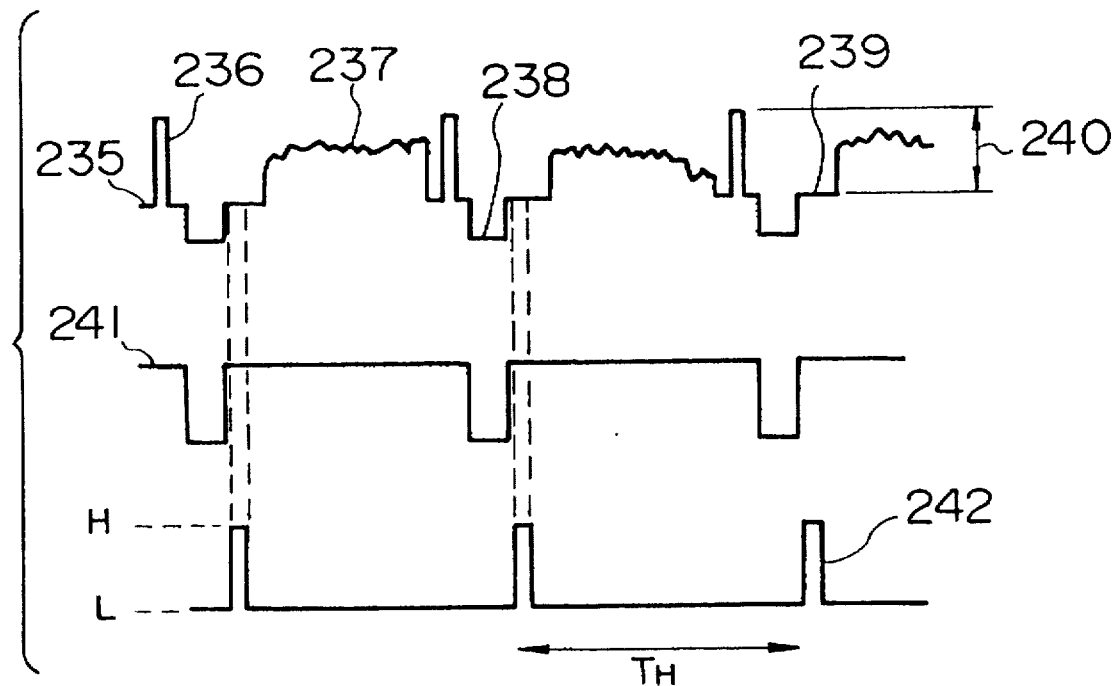
FIG. 28 is a waveform chart useful in explaining the operation of the image signal processing circuit shown in FIG. 27.

The operation of the input circuit shown in FIG. 27 will hereinbelow be described with reference to a waveform chart of FIG. 28. In FIG. 28, reference numeral 235 designates a waveform of an output signal of the adder 227, and reference numeral 236 designates a reference signal having a maximum amplitude which is previously inserted, in the image signal source such as the computer, into the horizontal front porch. Reference numeral 237 designates an image signal portion, reference numeral 238 designates a horizontal synchronous signal portion, reference numeral 239 designates a back porch portion, and reference numeral 240 designates amplitude of the reference signal. In addition, reference numeral 241 designates a waveform of an output signal of the synchronous separation circuit 202, and reference numeral 242 designates an output signal of the monostable-multivibrator 228 a pulse width of which is set narrower than the width of the back porch portion 239. Therefore, from the output terminal of the sampling and holding circuit 230, the voltage (the black level voltage) of the back porch portion in the composite image signal is detected. In the case where that black level voltage is excessively smaller/larger than the 0 V, the output voltage of the integrating circuit 231 is gradually decreased/increased. Therefore, the excessive high state/the excessive low state of the black level voltage at the output terminal of the adder 227 is corrected, and as a result, the black level voltage is maintained at 0 V. From the output terminal of the detection circuit 232, the reference signal amplitude designated by reference numeral 240 is detected. In the case where the magnitude of the reference signal amplitude is excessively larger/lower than that of the target value 234, the output voltage of the integrating circuit 233 is gradually decreased/increased. As a result, the gain of the transform circuit 226 is decreased/increased. Therefore, the excessive large state/ the excessive small state of the reference signal amplitude is properly corrected to make the reference signal amplitude coincide with the target value.

As for the effects of the structure shown in FIG. 27, there are provided an advantage that not only the fluctuation in the characteristics of the photoelectric transform circuit, of the image amplifying circuit in the subsequent stage and of the CRT can be absorbed and properly corrected, but also the fluctuation on the image signal source side can be absorbed and properly corrected. The reason is that normally, the above-mentioned reference amplitude signal is generated in the form of digital numbers in the computer of the image signal source, and hence digital numbers are independent of the temperature and the like.

Conversely, the application may also be adopted such that in the above-mentioned structure, the amplitude of the reference amplitude signal which is inserted into the front porch portion is intentionally increased/decreased, whereby the gain of the photoelectric transform circuit is automatically decreased/increased, thereby decreasing/increasing the brightness of the reproduced image.

The present invention can be applied to various kinds of television receivers which receive broadcasts based on HDTV system and EDTV system which have been developed in Japan and also to existing TV system. The horizontal scanning frequencies of the HDTV system, EDTV system and existing system are about 34 kHz, 32 kHz and 16 kHz, respectively. Therefore, to apply the present invention to these systems, the horizontal deflection frequency of the display of the present invention may be unified to about 34 kHz.

According to the above-mentioned embodiment, the image signal, of the various kinds of signal source, which has a wide range horizontal frequency the frequency ratio of which exceeds 3:1 can be reproduced on the screen of one CRT display device.

In this connection, since the horizontal deflection frequency can be made single, the switching of the capacitor for correcting the horizontal S-shaped distortion, which was required for the prior art multi-scan type display, can be made unnecessary. As a result, it is possible to attain the improvement in the reliability.

In addition, the horizontal blanking period ratio of the horizontal deflection output circuit can be enlarged up to about 1/5 or more as compared with that of about 1/6 in the prior art. Therefore, the breakdown voltage required for the horizontal output transistors can be reduced by about 20% or more. In addition, the switching loss can be reduced by about 40% or more. As a result, it is possible to attain both reduction of the consumed power and promotion of the reliability.

In addition, the vertical deflection circuit is operated at a vertical frequency proportional to the number of scanning lines of the input image signal, whereby the disappearance of the character font of the very fine character of the image signal source can be prevented. With respect to the vertical deflection circuit, the vertical S-shaped distortion is corrected on the basis of the cubes component of the signal which has approximately one to one correspondence to the vertical position on the image screen. Therefore, the image having the excellent linearity characteristics can be always reproduced.

In addition, in accordance with the control of increasing or decreasing the vertical deflection frequency, the reproduced image can be substantially, proportionally scaled up or down in the vertical direction. In the case where the present invention is applied to the CRT projection type display, increasing the vertical deflection frequency results in the luminous efficiency of the illuminant being improved. Thus, it is possible to provide the brighter and more beautiful image.

Therefore, according to the present invention, one display device can be applied to the various uses. Accordingly, it is expected that the present invention contributes much to the industry.

Next, the description will hereinbelow be given with respect to the preferred embodiment of a phase synchronous circuit, according to the present invention, which is excellent in the noise immunity and has the high speed pull-in characteristics.

Figure 29:
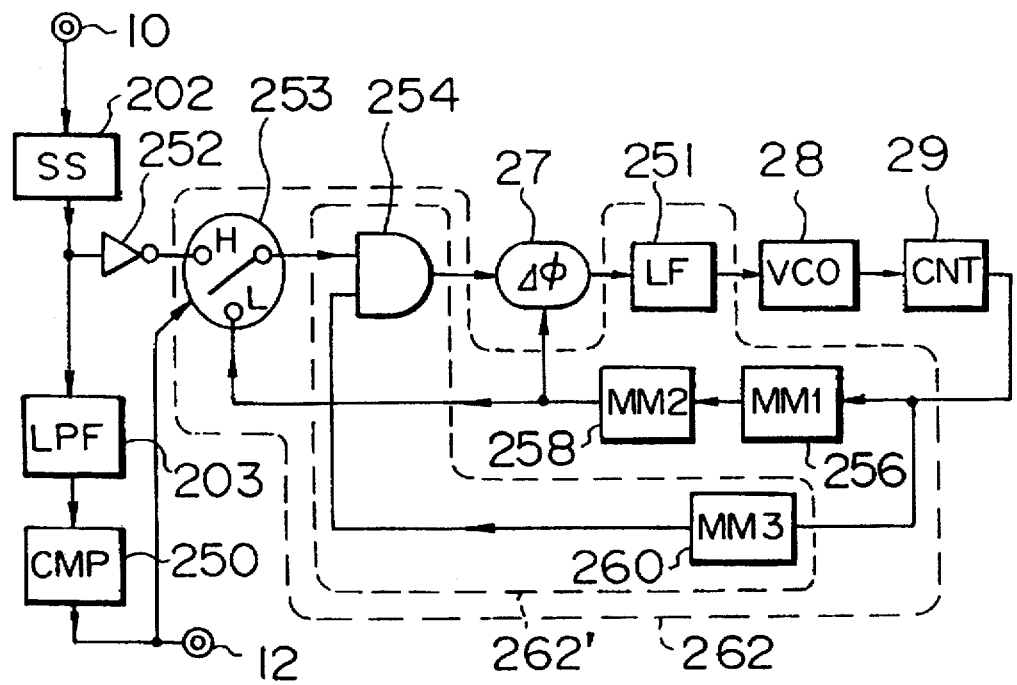
FIG. 29 is a block diagram showing a configuration of a phase synchronous circuit of another embodiment of the present invention.

FIG. 29 is a block diagram showing a configuration in the case where the phase synchronizing circuit of the present embodiment is applied to the horizontal phase synchronous circuit of the CRT display shown in FIG. 29. In FIG. 29, the portion surrounded by a dotted line 262 is the important portion of the present invention, and almost the remaining portions have been described with reference to FIG. 24.

In FIG. 29, reference numeral 10 designates an input terminal for receiving a composite image signal, reference numeral 202 designates a synchronous separation circuit, reference numeral 203 designates a low-pass filter, reference numeral 250 designates a comparator from an output terminal of which the vertical synchronous signal is obtained, reference numeral 252 designates an inverter, and reference numeral 253 designates a switch which operates to be connected to the lower side when the output of the comparator is at a level of "L", i.e., for the vertical synchronous signal interval, and connected to the upper side for the remaining intervals. Reference numeral 254 designates an AND gate, and reference numeral 27 designates a three state output digital phase detector. In this connection, as well known, the three states mean "H", release and "L". Reference numeral 251 designates a loop filter. The detailed example of the loop filter 251 will be described later with reference to FIG. 31. Reference numeral 28 designates a voltage controlled oscillator (hereinafter, referred to as "a VCO" for short, when applicable), reference numeral 29 designates a counter, and reference numerals 256, 258 and 260 designate monostable-multivibrator. Reference numeral 262' designates gate means which is the important portion of the present invention and operates to pass therethrough only the interval including the timing of the detecting edge of the input synchronous signal. The constituent elements 27, 251, 28, 29, 256 and 258 constitute a well known horizontal phase synchronous circuit (PLL).

The operation of the circuit shown in FIG. 29 will hereinbelow be described with reference to a waveform chart of FIG. 30. Now, reference numerals of the waveforms each of which has the mark "'" in FIG. 30 correspond to the waveforms of the output portions of the blocks which have the associated reference numerals in FIG. 29.

Figure 30:
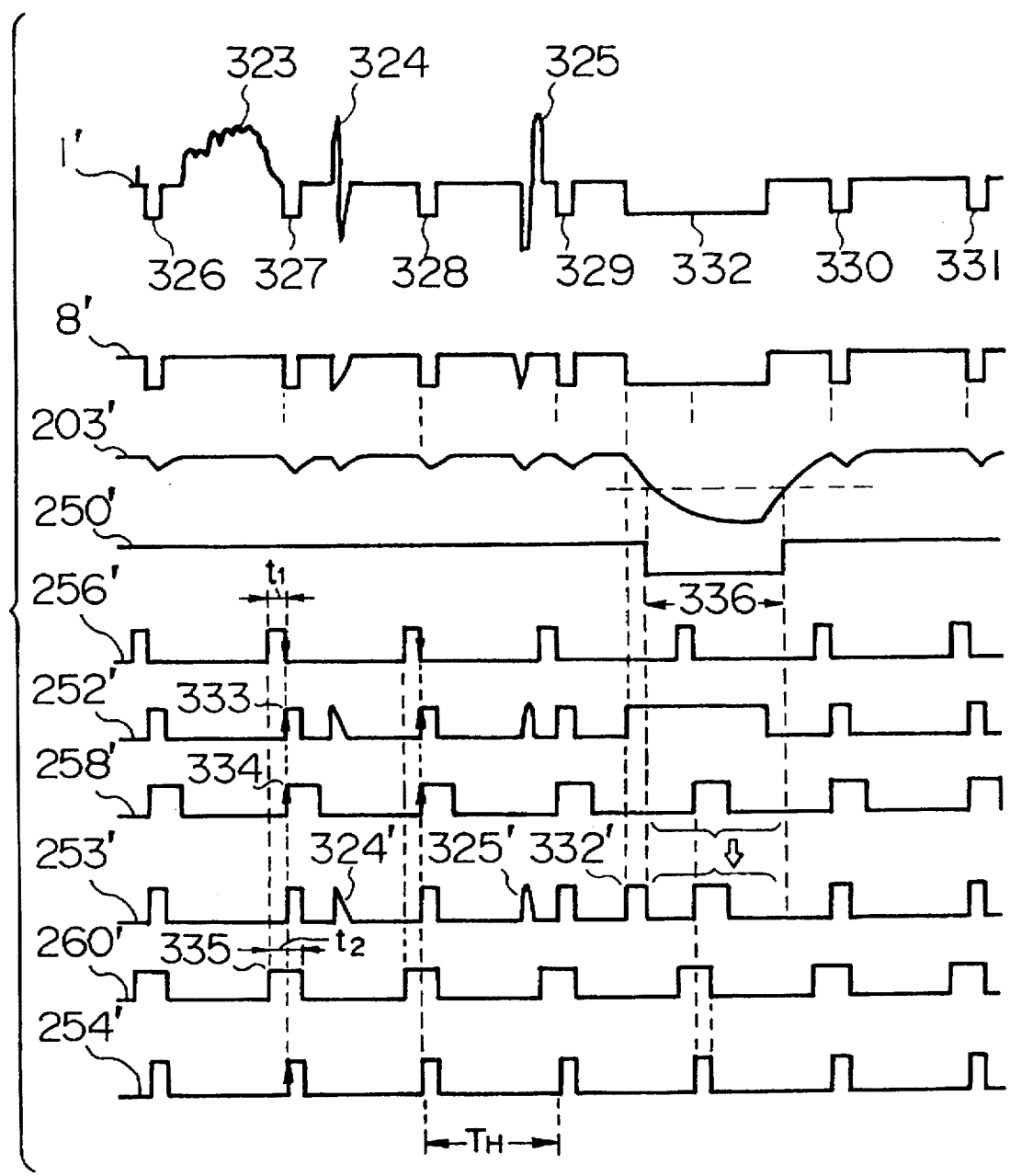
FIG. 30 is a waveform chart useful in explaining the operation of the phase synchronous circuit of another embodiment of the present invention shown in FIG. 29.

In FIG. 30, reference numeral 323 designates an image signal portion, reference numerals 324 and 325 designate disturbance noises, reference numerals 326, 327, 328, 329, 330 and 331 designate horizontal synchronous signal portions, and reference numerals 332 designates a vertical synchronous signal portion.

In accordance with the function of the switch 253, a waveform 253' coincides with a waveform 258' in an interval 326 in which the vertical synchronous signal is, as shown in a waveform 250', at a level of "L", and coincides with a waveform 252' in the remaining intervals. The signal having the waveform 253' is mixed with the disturbance noises 324' and 325', and an interval disturbance noise 332'. Those noises are multiplied by the signal having a waveform 260' in the AND gate 254, thereby producing a signal having a waveform 254'. In the waveform 254', those noises and the like are eliminated.

A pulse width (t1) of the monostable-multivibrator 256 is set to a value which is about 5% of the horizontal period (TH). A pulse width (t2) of the monomultivibrator 260 is set to a value about two times as wide as the pulse width t1. As shown in FIG. 30, the leading edge of the pulse signal having the pulse width t1 of the monostable-multivibrator 256 coincides with the leading edge of the pulse signal having the pulse width t2 of the monostable-multivibrator 260. On the other hand, the trailing edge of the pulse signal of the pulse width t1 of the monostable-multivibrator 256 coincides with the leading edge 334 of the pulse signal of the monostable-multivibrator 258 and also coincides with the timing 333 of the detecting edge of the input synchronous signal in the phase synchronous state (after the lock-in). The time point relating to this timing is positioned just at the center of the pulse width t2. This fact is, as described above, based on that the pulse width t2 is about two times as wide as the pulse width t1. The description of the present embodiment has been now completed.

Figure 31:
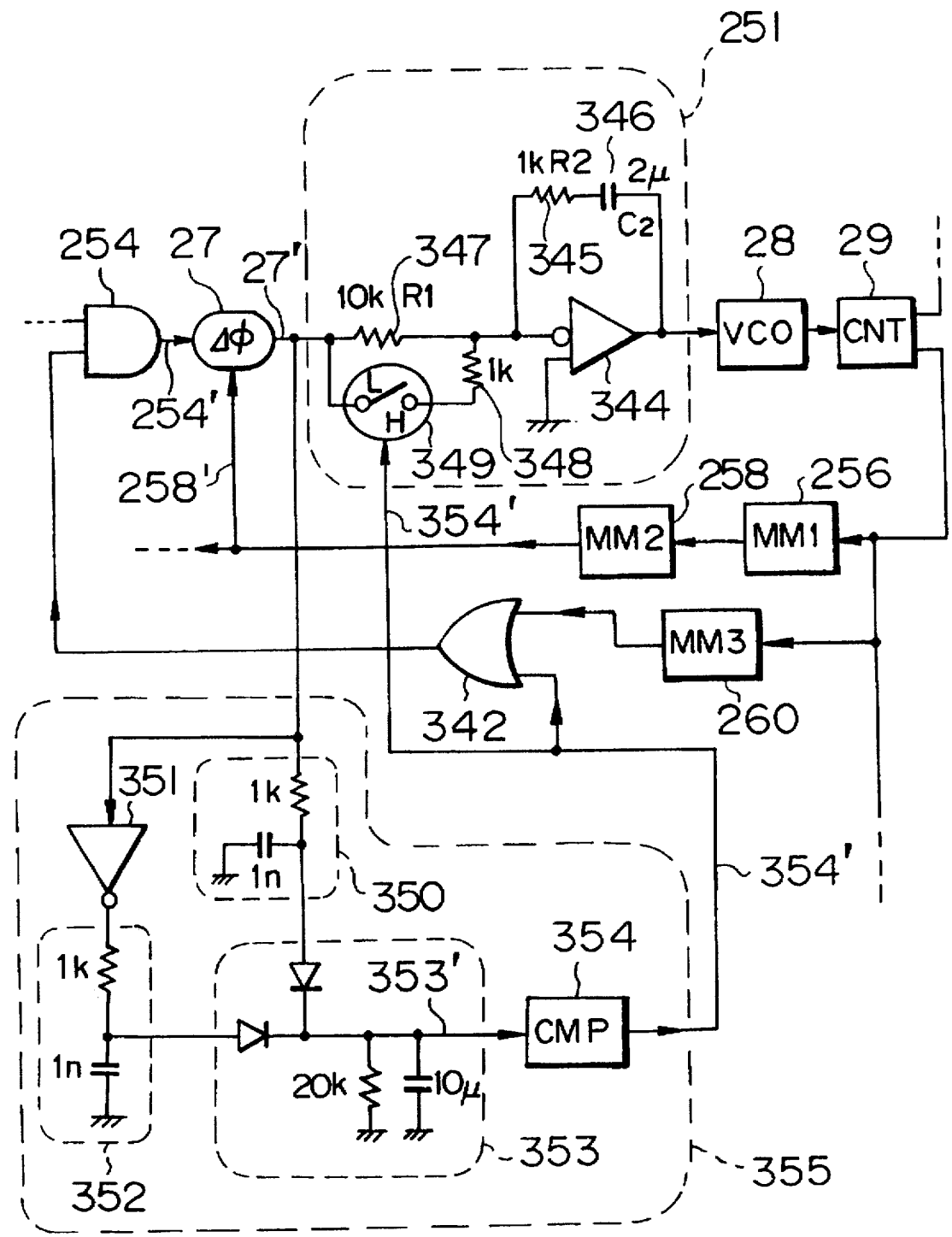
FIG. 31 is a circuit diagram, partly in block diagram, showing a configuration of the important portion of yet another embodiment of the present invention.

Next, a configuration of another embodiment of the present invention is shown in FIG. 31. FIG. 31 shows only the additional portions which are different in the configuration from the circuit shown in FIG. 29. But, the constituent elements 254, 27, 28, 29, 256, 258 and 260 are the same as those of FIG. 29.

In the figure, reference numerals 355, 349 and 342 designate respectively a lock-out detector means, a loop gain switching circuit means, and a gate function switching circuit means which are the main portions of the present invention. In the concrete example, the loop gain switching circuit 349 is composed of a switch, and the gate function switching circuit 342 is composed of an OR gate.

Reference numeral 344 designates an operational amplifier, reference numerals 345, 347 and 348 designate resistors, respectively, reference numeral 346 designates a capacitor, and reference numeral 349 designates a switch which operates to be connected to the "ON" side only when a controlling input 354 is at a level of "H", and released for the remaining periods. The loop gain Gl(P) of the PLL is given by Expressions (22) to (25).

$$Gl(P) = \frac{\mu}{2\pi} \cdot \frac{R_2 + \frac{1}{PC_2}}{R_1} \cdot \frac{2\pi\beta}{P} \quad (22)$$

$$= \frac{1 + \tau_2 P}{(\tau_0 P)^2} \quad (23)$$

where $$\tau_0 \equiv \sqrt{\frac{C_2 R_1}{\mu\beta}} \approx 1 \text{ ms}, \quad (24)$$

and $$P \equiv jw = j2\pi f, \text{ and } \tau_2 \equiv C_2 R_2 \quad (25)$$

In Expression (22), μ means that the output voltage of the phase detector 27 is ±μ·β means that the frequency control sensitivity of the VCO 28 and the counter 29 is βHz/V. In the present example, the value of μ is 1, and the value of β is 20 kHz/V. P represents a complex angular frequency, ω represents an angular frequency, and f represents a frequency. The resistance values of R1 and R2, and the capacitance value of C2 are as shown in FIG. 31.

In FIG. 31, reference numerals 350 and 352 designate low-pass filters each of which operates to pass therethrough only a pulse signal having a pulse width of 1 μsec or more, reference numeral 351 designates an inverter, and reference numeral 353 designates a circuit for detecting and holding a maximum value. The time constant of the holding portion is set to about 0.2 sec. The operation of the constituent elements 350 to 354 will hereinbelow be described with reference to a waveform chart shown in FIG. 32. In the figure, reference numerals 27', 353' and 354' designate waveforms of the signals at the output terminals of the detector 27, the circuit 353 and the comparator 354, respectively. Reference numeral 343 designates a threshold electric potential of the comparator 354.

The reason that the holding time of the maximum value detecting and holding circuit is selected to be about 0.2 sec is shown by Expression (27) as will be described later. The description of the waveform chart shown in FIG. 32 has now been completed.

Figure 32:
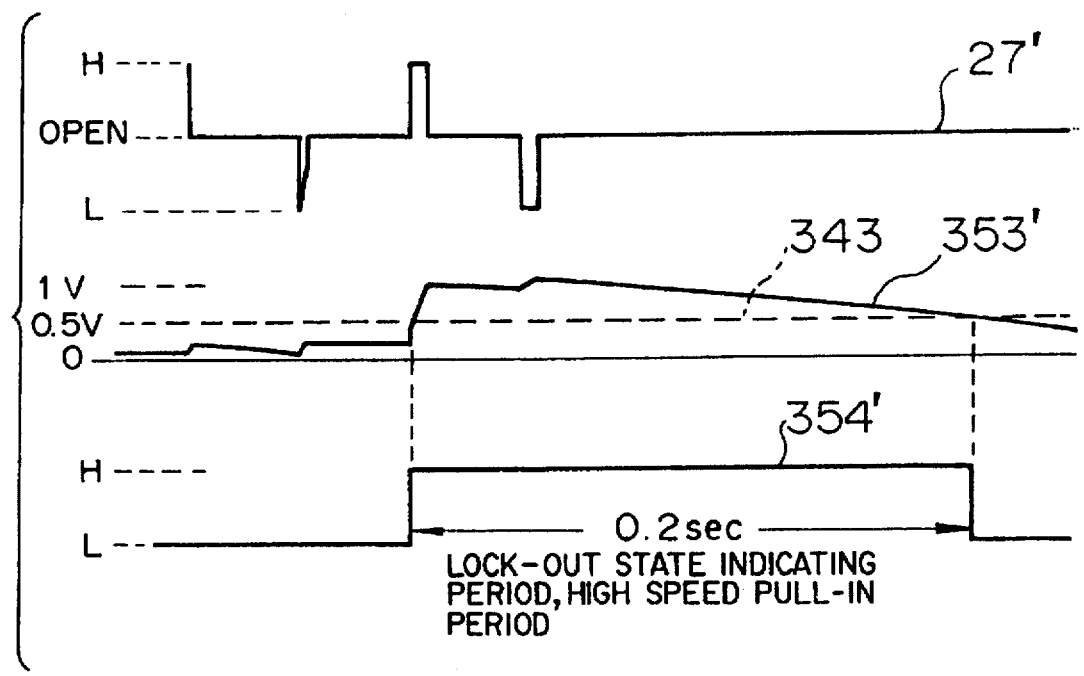
FIG. 32 is a waveform chart useful in explaining the operation of yet another embodiment shown in FIG. 31.

The signal having the waveform 354' shown in FIG. 32 is applied to both the constituent elements 342 and 349 of FIG. 31. The output signal of the OR gate 342 is always maintained at a level of "H" for the period of time when the waveform 354' is at a level of "H". Therefore, the gate function of the AND gate 254 for the noise resistance is stopped for that period of time.

Figure 33:
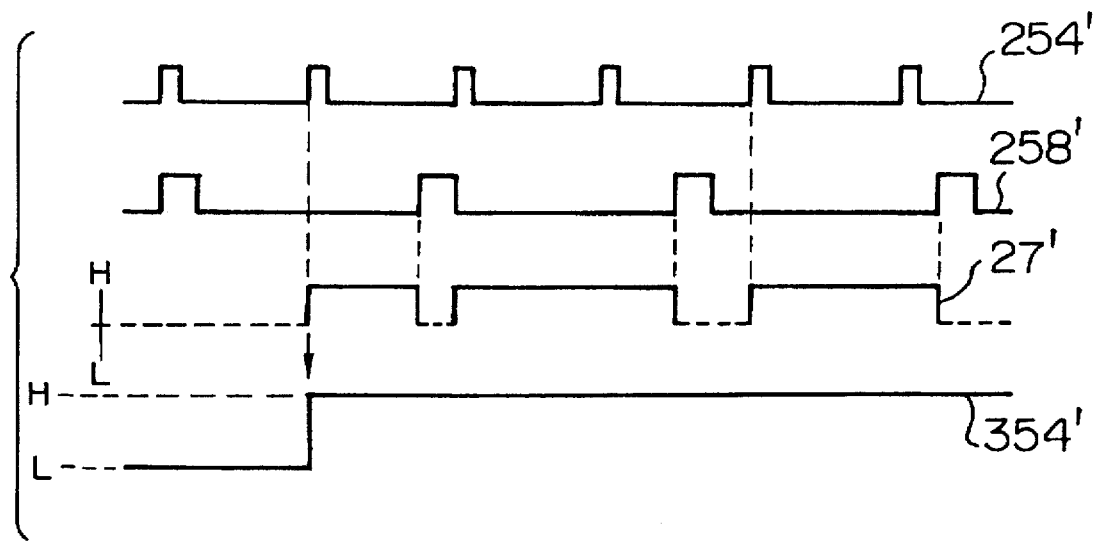
FIG. 33 is a waveform chart useful in explaining the operation of yet another embodiment shown in FIG. 31.
Figure 34:
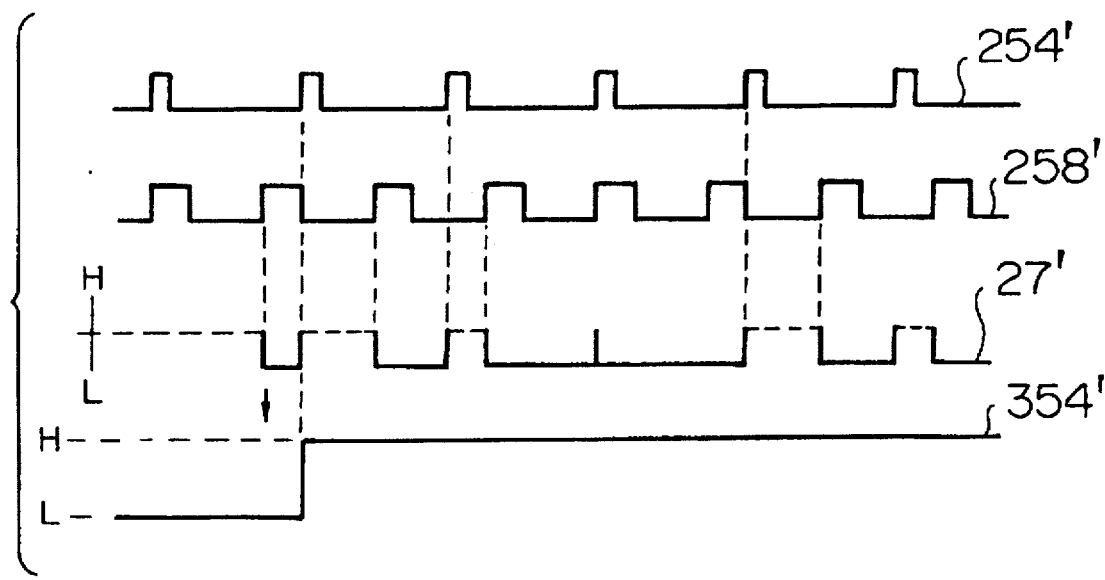
FIG. 34 is a waveform chart useful in explaining the operation of yet another embodiment shown in FIG. 31.

Next, the description will hereinbelow be given with respect to waveform charts shown in FIGS. 33 and 34. In the figures, reference numerals 254', 258', 27' and 354' designate waveforms of the signals at the output terminals of the constituent elements 254, 258, 27 and 354 of FIG. 31. FIGS. 33 and 34 show a specific case where the repetition frequency (the output frequency of the PLL) of the output pulse signal of the monostable-multivibrator is excessively lower/higher than that of the input horizontal synchronous signal. In accordance with the property of a well known three state output digital phase detector 27, the output waveform 27' shown in FIGS. 33 and 34 is obtained. Therefore, from the output terminal of the lock-out detector 355 shown in FIG. 31, the output signal having the waveform 354' is obtained.

For the period of time when the signal having the waveform 354' is maintained at a level of "H", the switch 349 is connected to the "ON" side, and also the loop gain of the phase synchronous circuit is increased by two times or more (about ten times in the numerical example of FIG. 31). The frequency drawing time of the phase synchronous circuit is given by Expression (26) because the angular frequency change speed is expressed by $1/\tau_o$ in Expression (23).

$$T = \frac{2\pi\Delta f}{\tau_o^2} \sim \frac{4\pi\Delta f}{\tau_o^2} \quad (26)$$

where Δf represents the initial frequency difference, i.e., the difference between the repetition frequency of the input horizontal synchronous signal and the initial frequency of the PLL output.

The present embodiment is based on the assumption that the horizontal frequency is in the range of 40 kHz to 200 kHz. Therefore, a maximum value of the difference therebetween is about 160 kHz. That is, a maximum value of Δf is about 160 kHz. Then, this condition is substituted into Expression (26), thereby obtaining the following Expression.

$$\Delta f = 160 \text{ kHz} \quad (27)$$

$$\begin{cases} T = 1\sim2 \text{ sec for } R_1 = 10 \text{ k}\Omega, \tau_0 = 1 \text{ m sec} \\ T = 0.1\sim0.2 \text{ sec for } R_1 = 1 \text{ k}\Omega \end{cases}$$

As can be understood from the above Expression, in the case where in FIG. 31, both the switch 349 for the loop gain switching means and the lock-out detector means 355 are not employed, for the pull-in time of the phase synchronous circuit, the long time of about 1 sec to about 2 sec is required. By the functions of the switch 349 and the lock-out detector 355, this time can be shortened by about 1/10 times. The time constant of the maximum value detecting and holding circuit 353 of FIG. 31 is set so as to substantially coincide with the pull-in time thus shortened of 0.2 sec.

Figure 35:
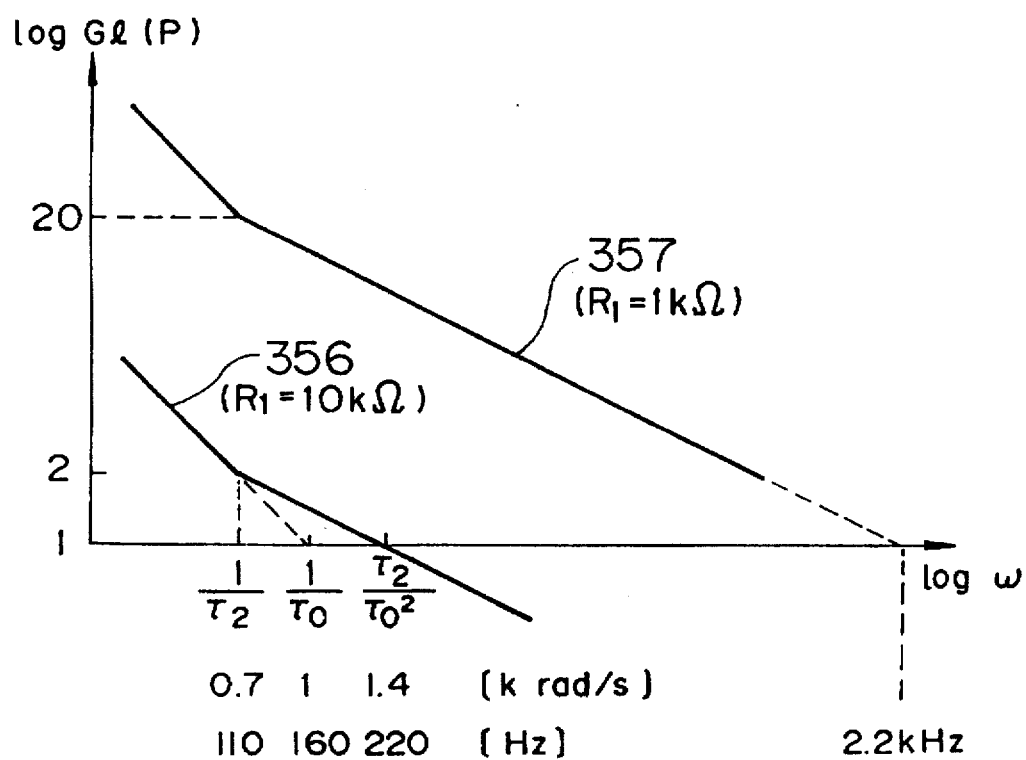
FIG. 35 is a graphical representation useful in explaining the operation of yet another embodiment shown in FIG. 31.

FIG. 35 is a Bode diagram showing the frequency characteristics of the loop gain. In the figure, a graph 356 corresponds to the state in which the switch 349 is turned OFF, i.e., the steady state after the completion of the pull-in operation. A graph 357 corresponds to the state in which the switch 349 is turned ON, i.e., the state in which the pull-in operation is in execution. As can be seen from FIG. 35, in the steady state, the cut-off frequency (about 220 Hz) of the phase synchronous circuit (PLL) is a low frequency. In general, if the cut-off frequency is lowered, approximately in proportion to the square root thereof, the amplitude of the output noise can be reduced. Therefore, the noise resistance characteristics in the steady operating state can be kept being excellent. On the other hand, in the pull-in operation state, the cut-off frequency (2.2 kHz) of the PLL is a high frequency. In this state, the noise resistance characteristic or noise immunity is poor. However, as has already been described, it is possible to attain the shortening of the pull-in time. The description of FIG. 35 has been completed.

In FIG. 29, it was assumed that the composite image signal is input in which the synchronous signal and the image signal are combined. However, in another application field, the image signal input, the horizontal synchronous signal input and the vertical synchronous signal input are respectively supplied through separate cables. In such a case, it is apparent that all the synchronous separation circuit 202, the switch 253, the AND gate circuits 254 and 342, and the monomultivibrators 256, 258 and 260 become unnecessary.

Figure 36:
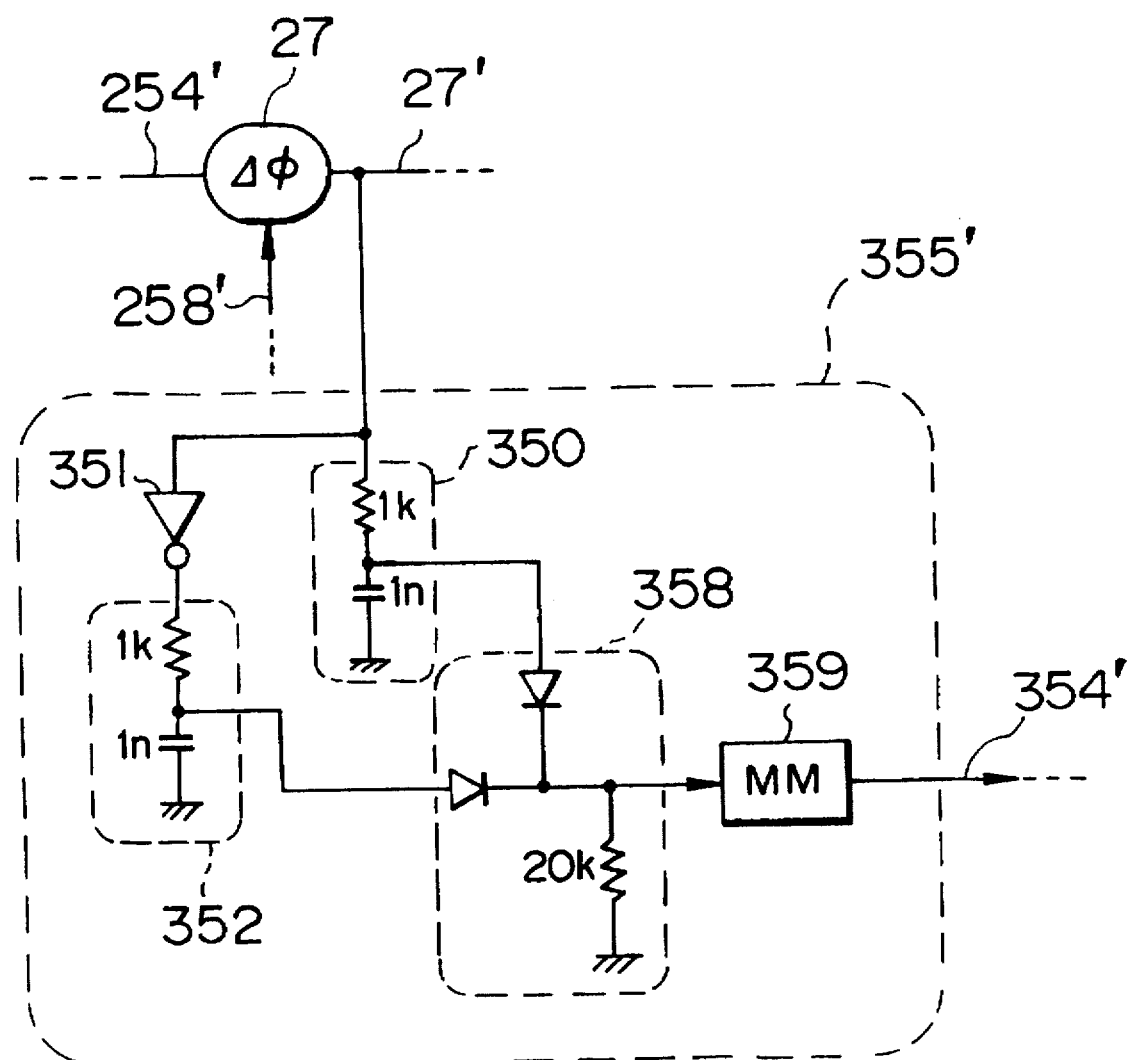
FIG. 36 is a circuit diagram, partly in block diagram, showing a configuration of a modification of a lock-out detector shown in FIG. 31.

FIG. 36 shows a configuration of a modification 355' of the lock-out detector means 355 (refer to FIG. 31). In the figure, the constituent elements 27, 350, 351 and 352 are the same as those shown in FIG. 31.

Reference numeral 358 designates a circuit for detecting a maximum value, and reference numeral 359 designates a monostable-multivibrator. In this connection, the width of the output pulse signal having the "H" porality of the monostable-multivibrator 359 is set wider than the above-mentioned pull-in time. Therefore, the block 355' has, as apparent from FIG. 30, substantially the same function as that of the above-mentioned block 55. The description of FIG. 36 has been completed.

Figure 37:
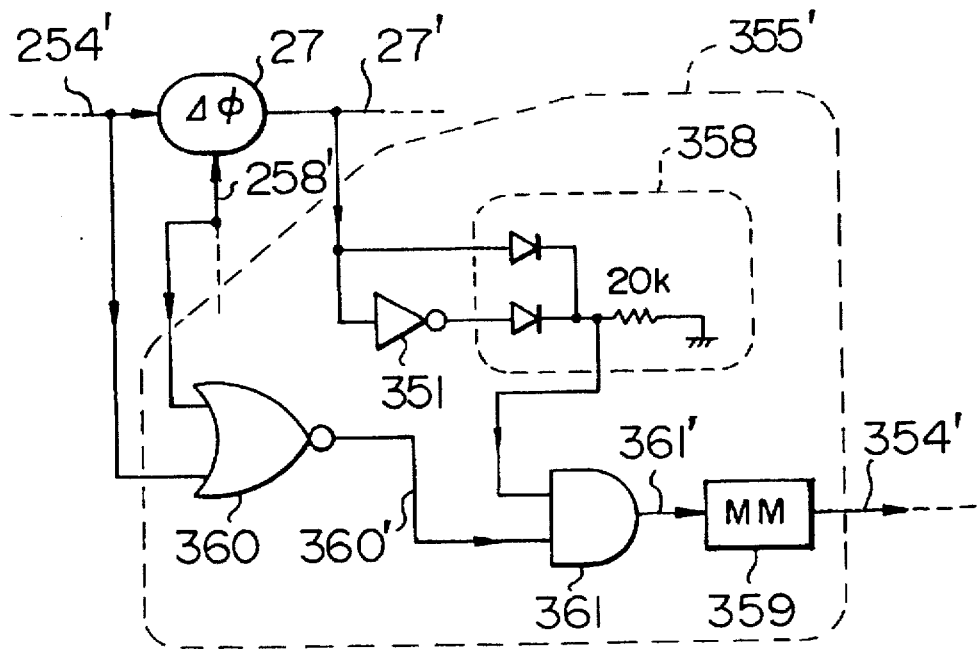
FIG. 37 is a circuit diagram, partly in block diagram, showing a configuration of another modification of the lock-out detector shown in FIG. 31.
Figure 38:
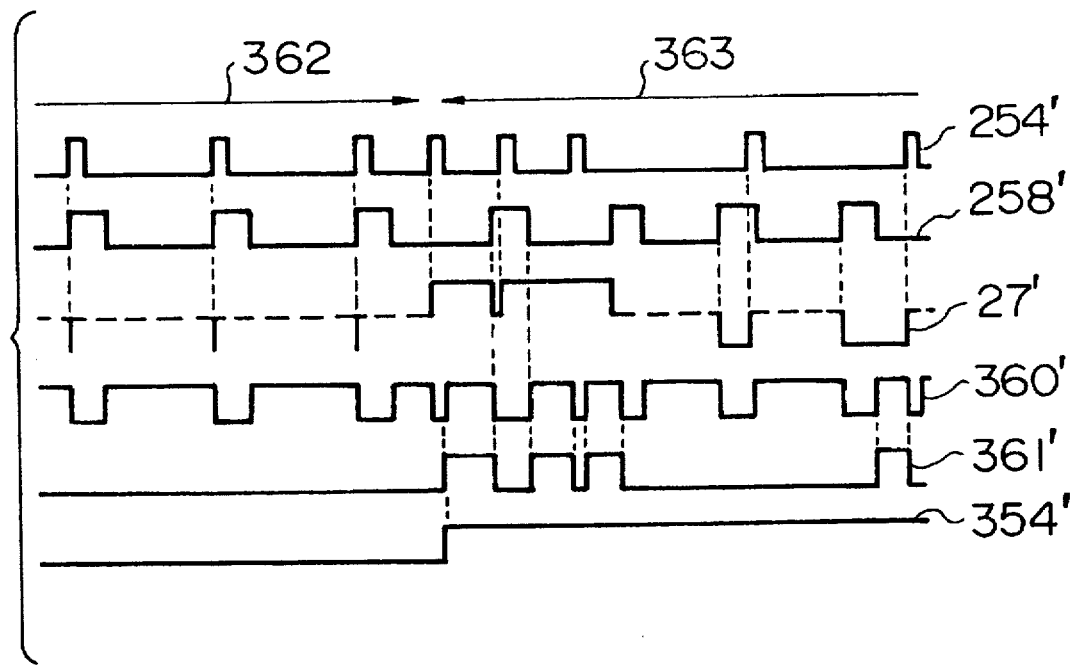
FIG. 38 is a waveform chart useful in explaining the operation of the lock-out detector shown in FIG. 37.

FIG. 37 shows a configuration of another modification 355" of the lock-out detection. In the figure, the phase detector 27, the output signals 254', 27' and 258', the constituent elements 351, 358 and 359, and the output signal 354' are the same as those shown in FIGS. 31 and 36. In the figure, reference numeral 360 designates a NOR gate, reference numeral 360' designates an output signal of the NOR gate 360, reference numeral 361 designates an AND gate, and reference numeral 361' designates an output signal of the AND gate 361. The waveforms of the associated portions are shown in FIG. 38. In the figure, an interval 362 is a normal interval, and an interval 363 is a lock-out interval. As can be seen from the figure, from the output terminal of the lock-out detector 355", the lock-out detection pulse signal 354' can be output. The description of FIGS. 37 and 38 has been completed.

The description of the preferred embodiment of the present invention has been completed.

According to one preferred embodiment of the present invention, it is possible to improve the noise immunity of the phase synchronous circuit. According to another preferred embodiment of the present invention, it is possible to improve the noise immunity, in the steady state of the phase synchronous circuit, and also to promote the shortening of the pull-in time. More specifically, the pull-in time can be shortened from about 1 to 2 sec in the prior art down to about 0.2 sec. Accordingly, it is possible to greatly reduce the period of time when the image is disturbed in the case where the horizontal frequency of the signal source is switched.

What is claimed is:

1. A scalable CRT display device comprising: a scan converter unit; and a display unit, said scan converter unit including digital memory means, output horizontal frequency unifying means, horizontal blanking period ratio converting means, output vertical frequency converting means and vertical blanking period ratio converting means;

said display unit including at least a horizontal deflection circuit, a vertical deflection circuit and an image amplifying circuit, said vertical deflection circuit including vertical S-shaped distortion correcting means for correcting a vertical S-shaped distortion independently of a vertical deflection frequency, wherein said scan converter unit serves to write, on the basis of a sampling clock signal which is generated by a first phase synchronous circuit and synchronized to a horizontal frequency of an input image signal, the input image signal to said digital memory means, and said output horizontal frequency unifying means is composed of a second phase synchronous circuit having an approximately fixed output horizontal frequency and serves to read out, on the basis of a clock signal generated by said second phase synchronous circuit, the necessary output image signal from said digital memory means;

said horizontal blanking period ratio converting means serves to determine a ratio of the number of picture elements, during the horizontal blanking period, of the output image signal to the total number of picture elements per horizontal period, and thus, said second phase synchronous circuit operates in such a way that the clock frequency generated by said second phase synchronous circuit becomes equal to the product of the output horizontal frequency and the total number of picture elements;

said output vertical frequency converting means serves to output a signal having a vertical frequency so as for the output vertical frequency to be substantially inversely proportional to the total number of output scanning lines;

said vertical blanking period ratio converting means serves to limit the number of scanning lines, during the vertical blanking period, of the output image signal in such a way that the vertical blanking period of the output image signal becomes approximately fixed; and said vertical S-shaped distortion correcting means serves to correct the linearity of vertical deflection on the basis of a cubic component of an amplitude of a signal which has approximately one to one correspondence to the vertical position on the image screen.

2. A scalable CRT display device according to claim 1, wherein at least one of said first and second phase synchronous circuits includes a fixed frequency oscillator, a voltage controlled variable frequency oscillator, a mixing circuit, a low-pass filter, a counter circuit and a phase detector; wherein said mixing circuit and said low-pass filter serve to output a signal relating to a difference between the oscillation frequencies of said fixed and variable frequency oscillators, said counter circuit serves to count the frequency difference, and said phase detector serves to detect and compare a frequency of an input signal to said at least one phase synchronous circuit and a frequency of an output signal of said counter circuit with each other, and on the basis of an output of said phase detector, said voltage controlled variable frequency oscillator is controlled; and wherein a ratio of a maximum value to a minimum value of an oscillation frequency of said voltage controlled variable frequency oscillator is equal to or smaller than 1.5, and a ratio of a maximum value to a minimum value of the frequency difference is equal to or larger than 3.

3. A scalable CRT display device according to claim 1, further comprising means for detecting a phase shift of the sampling clock signal, wherein said detection means is constituted by a circuit for detecting the first order difference of the input image signal, a circuit for detecting the second order difference of said phase detector, and a multiplication circuit for multiplying the first order difference by the second order difference.

4. A scalable CRT display device according to claim 1, further comprising microprocessor means for enabling a change of a vertical enlargement ratio of a reproduced image.

5. A scalable CRT display device according to claim 1, further comprising square circuit means for enabling correction of a pincushion distortion.

6. A scalable CRT display device according to claim 1, wherein said horizontal blanking period ratio converting means serves to determine a ratio of the number of picture elements, during the horizontal blanking period, of the output image signal to the total number of picture elements per horizontal period to the range of substantially 1/5 to 1/3.

7. A scalable CRT display device according to claim 1, wherein said vertical deflection circuit of said display unit comprises a vertical deflection output circuit having negative feedback amplifier means and a resonance capacitor means resonating with a vertical deflecting coil, wherein by the operation of said negative feedback amplifier means, in a first half of a vertical blanking period, the pre-boost deflection is performed so as for electron beams to be emitted downward and outside the screen frame, and in a second half of the vertical blanking period, vertical retrace line deflection is performed by the fly-back resonance between said vertical deflecting coil and said resonance capacitor.

8. A scalable CRT display device according to claim 1, wherein at least one of said first and second phase synchronous circuits comprise:

a phase detector;

a loop filter;

a voltage controlled oscillator;

lock-out detecting means for detecting a lock-out state of said phase synchronous circuit; and loop gain switching means for increasing/decreasing a loop gain of said PLL, wherein an input of said lock-out detecting means is connected to at least an output of said phase detector, and an output of said lock-out detecting means is connected so as to control said loop gain switching means, and wherein a period of time when the output of said lock-out detecting means indicates a lock-out indication state, said loop gain switching means is switched to the loop gain increasing side, and for the remaining periods of time, said loop gain switching means is switched to the loop gain decreasing side.

9. A scalable CRT display device according to claim 1, further comprising switching switch means for switching, in the case where an input horizontal frequency is sufficiently high and close to an output horizontal frequency, the output single horizontal frequency to the input horizontal frequency.

10. A scalable CRT display device according to claim 1, further comprising a synchronous separation circuit for separating horizontal and vertical synchronous signals, superimposed on the input image signal, from each other, switch means for substituting an output horizontal pulse signal of said first phase synchronous circuit for the input horizontal synchronous signal input to said first phase synchronous circuit at least in a horizontal synchronous signal abnormal interval, and means for avoiding the phase detection side edge timing of a phase detector of said first phase synchronous circuit in the switching timing of said switch means.

11. A circuit for detecting a phase shift of a sampling clock signal, said detection circuit comprising: a circuit for detecting a first order difference of an input image signal; a circuit for detecting a second order difference of said input image signal; and a multiplication circuit for multiplying the first order difference by the second order difference.

* * * * *